United States Patent
Jin et al.

(10) Patent No.: US 8,105,489 B2
(45) Date of Patent: Jan. 31, 2012

(54) TREATMENT AND PREVENTION SYSTEMS FOR ACID MINE DRAINAGE AND HALOGENATED CONTAMINANTS

(75) Inventors: Song Jin, Fort Collins, CO (US); Paul H. Fallgren, Laramie, WY (US); Jeffrey M. Morris, Laramie, WY (US)

(73) Assignee: The University of Wyoming Research Corporation, Laramie, WY (US)

( * ) Notice: Subject to any disclaimer, the term of this patent is extended or adjusted under 35 U.S.C. 154(b) by 0 days.

(21) Appl. No.: 12/666,625

(22) PCT Filed: Jun. 26, 2008

(86) PCT No.: PCT/US2008/068396
§ 371 (c)(1), (2), (4) Date: Dec. 23, 2009

(87) PCT Pub. No.: WO2009/038851
PCT Pub. Date: Mar. 26, 2009

(65) Prior Publication Data
US 2010/0329790 A1    Dec. 30, 2010

Related U.S. Application Data

(60) Provisional application No. 60/937,455, filed on Jun. 26, 2007.

(51) Int. Cl.
C02F 3/00 (2006.01)
(52) U.S. Cl. .............. 210/610; 210/611; 210/198.1
(58) Field of Classification Search ........... 210/610–611
See application file for complete search history.

(56) References Cited

U.S. PATENT DOCUMENTS

| | | |
|---|---|---|
| 3,388,058 A | 6/1968 | Wirth |
| 3,516,931 A | 6/1970 | Birch |
| 3,823,081 A | 7/1974 | Treharne et al. |
| 4,695,378 A | 9/1987 | Ackman et al. |
| 4,869,905 A | 9/1989 | Sobek et al. |
| 4,886,432 A | 12/1989 | Kimberlin |
| 4,906,575 A | 3/1990 | Silver |
| 5,171,454 A | 12/1992 | Bockowski et al. |
| 5,200,033 A | 4/1993 | Weitzman |
| 5,439,594 A | 8/1995 | Regan et al. |
| 5,550,141 A | 8/1996 | Gould et al. |
| 5,554,290 A | 9/1996 | Suthersan |
| 5,575,589 A | 11/1996 | Suthersan |
| 5,588,490 A | 12/1996 | Suthersan |
| 5,616,251 A | 4/1997 | Batarseh |
| 5,698,107 A | 12/1997 | Wurzburger et al. |

(Continued)

FOREIGN PATENT DOCUMENTS
WO    9702333    1/1997
(Continued)

OTHER PUBLICATIONS

International Patent No. PCT/US08/68396, International Preliminary Report on Patentability dated Feb. 26, 2010.

(Continued)

*Primary Examiner* — Chester Barry
(74) *Attorney, Agent, or Firm* — Santangelo Law Offices, P.C.

(57) ABSTRACT

Embodiments include treatments for acid mine drainage generation sources (10 perhaps by injection of at least one substrate (11) and biologically constructing a protective biofilm (13) on acid mine drainage generation source materials (14). Further embodiments include treatments for degradation of contaminated water environments (17) with substrates such as returned milk and the like.

133 Claims, 12 Drawing Sheets

U.S. PATENT DOCUMENTS

| | | | |
|---|---|---|---|
| 5,833,855 | A | 11/1998 | Saunders |
| 6,007,274 | A | 12/1999 | Suthersan |
| 6,102,623 | A | 8/2000 | Suthersan |
| 6,116,816 | A | 9/2000 | Suthersan |
| 6,143,177 | A | 11/2000 | Suthersan |
| 6,165,251 | A | 12/2000 | Lemieux et al. |
| 6,174,108 | B1 | 1/2001 | Suthersan |
| 6,196,765 | B1 | 3/2001 | Harrington |
| 6,254,310 | B1 | 7/2001 | Suthersan |
| 6,280,118 | B1 | 8/2001 | Suthersan |
| 6,283,674 | B1 | 9/2001 | Suthersan |
| 6,322,700 | B1 | 11/2001 | Suthersan |
| 6,398,960 | B1 | 6/2002 | Borden |
| 6,481,929 | B1 | 11/2002 | Layton |
| 6,555,001 | B1 | 4/2003 | Crossman |
| 6,616,845 | B2 | 9/2003 | Shechter et al. |
| 6,632,364 | B1 | 10/2003 | Suthersan |
| 6,777,449 | B2 | 8/2004 | Vance et al. |
| 6,783,678 | B2 | 8/2004 | Sorenson |
| 6,790,352 | B1 | 9/2004 | Wurzburger et al. |
| 6,797,171 | B2 | 9/2004 | Bartlett |
| 6,916,136 | B2 | 7/2005 | Layton et al. |
| 6,932,909 | B2 | 8/2005 | Rey |
| 6,962,662 | B2 | 11/2005 | Wurzburger |
| 6,967,099 | B1 | 11/2005 | Hince |
| 7,030,617 | B2 | 4/2006 | Conti |
| 7,033,507 | B2 | 4/2006 | Zhuang |
| 7,077,963 | B2 | 7/2006 | McConchie et al. |
| 7,115,201 | B2 | 10/2006 | Rey |
| 7,140,495 | B2 | 11/2006 | Hester et al. |
| 7,141,170 | B2 | 11/2006 | Sorenson, Jr. |
| 7,147,779 | B1 | 12/2006 | Phifer |
| 7,153,541 | B2 | 12/2006 | Elsetinow |
| 7,189,329 | B2 | 3/2007 | Barak |
| 7,338,597 | B1 | 3/2008 | Rittmann et al. |
| 2002/0151602 | A1 | 10/2002 | Vance et al. |
| 2003/0108394 | A1 | 6/2003 | Layton et al. |
| 2004/0245187 | A1 | 12/2004 | Vance et al. |
| 2005/0036930 | A1 | 2/2005 | Elsetinow et al. |
| 2006/0024659 | A1 | 2/2006 | Becker et al. |
| 2007/0045542 | A1 | 3/2007 | Hashmonay |
| 2007/0163954 | A1 | 7/2007 | Badreddine |

FOREIGN PATENT DOCUMENTS

| | | |
|---|---|---|
| WO | 0206540 A2 | 1/2002 |
| WO | 2007027406 A1 | 3/2007 |
| WO | 2007098475 A2 | 8/2007 |
| WO | 2007098475 A3 | 8/2007 |
| WO | 2009038851 A2 | 3/2009 |

OTHER PUBLICATIONS

JRW Bioremediation LLC, Bioremediation Products; www.jrwbioremediation.com; Jun. 25, 2007; 2 pages.

JRW Bioremediation LLC, Bioremediation Products Leader; Cost Effective Bioremediation Amendments; www.jrwbioremediation.com; Jun. 25, 2007; 3 pages.

Technology Development—The EOS® Process (U.S. Patent # 6,398,960/International Patents pending); Innovation Dechlorination; www.solutions-ies.com; Jun. 25, 2007; 2 pages.

Arcadis, Remediation; www.arcadis-us.com; Jun. 25, 2007; 1 page.

Arcadis, Focused on our market trends; www.arcadis-us.com; Jun. 25, 2007, 1 page.

Johnson, et al., Acid mine drainage remediation options: a review, Science of the Total Environment 38 (2005) 3-14.

Jin et al., Source Treatment of Acid Mine Drainage at a Backfilled Coal Mine Using Remote sensing and Biogeochemistry, Water Air Soil Pollution (2008) 188:205-212 Published on line Nov. 7, 2007 Springer Science + Business Media B.V. 2007.

Jin et al., Biological Source Treatment of Acid Mine Drainage Using Microbial and Substrate Amendments: Microcosm Studies, Mine Water Environment Springer-Verlag 2007.

Ueshima et al., Development of Iron-Phosphate Biofilms on Pyritic Mine Waste Rock Surfaces Previously Treated with Natural Phosphate Rocks, Geomicrobiology Journal, 21:313-323, 2004, ISSN: 0149-0451 print / 1362-3087 online.

Zhang et al., Physical Structrues of Lipid Layers on Pyrite, Environ. Sci. Technol. 2006, 40, 1511-1515.

Zhang et al., Pyrite oxidation inhibition by a cross-linked lipid coating, Geochem. Trans., 2003, 4(2), 8-11.

International Patent No. PCT/US08/68369, International Search Report dated Mar. 10, 2009.

International Patent No. PCT/US08/68369, Written Option of the International Searching Authority dated Mar. 10, 2009.

U.S. Appl. No. 60/937,455, filed Jun. 26, 2007.

Microcosm treatment matrix, all treatments replicated 3 times.

| Treatment | Waste Material | | | Duration (d) |
|---|---|---|---|---|
| | STP | SRP | CR | |
| Control (water) | ▨ | ▨ | ▨ | 90 |
| Inoculum only (ES) | ▨ | ▨ | | 90 |
| Substrate only (milk) | ▨ | ▨ | | 90 |
| Substrate (milk) + inoculum (ES) | ▨ | ▨ | ▨ | 90 |
| Substrate only (dry milk) | ▨ | ▨ | | 42 |
| Substrate (milk) + inoculum (ES enrich) | ▨ | ▨ | | 42 |
| Substrate (dry milk) + inoculum (ES) | ▨ | ▨ | | 42 |

Fig. 10

Chemical characterization of water collected from Rich Gulch Creek and water extractions of mine waste material collected from the Sheldon Mine site, Prescott National Forest, AZ.

| Parameter | Water Samples | | | Mine Waste Extractions[a] | | |
|---|---|---|---|---|---|---|
| | RGC-1 | RGC-2 | RGC-3 | STP | SRP | CR |
| pH | 6.88 | 4.15 | 2.98 | 3.47 | 3.42 | 3.81 |
| EC (dS/m) | 0.73 | 1.43 | 3.55 | 7.44 | 8.49 | 2.71 |
| | mg/L | | | mg/kg | | |
| DOC | 10.5 | 5.3 | 7.3 | 15.0 | 9.4 | 5.7 |
| $SO_4^{2-}$ | 70 | 345 | 682 | 1,419 | 1,792 | 450 |
| $Cl^-$ | BD[b] | BD | BD | BD | BD | BD |
| $NO_3^-$ | BD | BD | BD | BD | BD | BD |
| $PO_4^{3-}$ | BD | BD | BD | BD | BD | BD |
| Na | 15.0 | 17.2 | 17.4 | 5.6 | 2.9 | 2.1 |
| K | 1.3 | 1.1 | 0.8 | 3.3 | 2.5 | 2.1 |
| Mg | 8.7 | 15.5 | 24.2 | 10.1 | 46.9 | 2.2 |
| Ca | 37 | 67 | 100 | 490 | 487 | 131 |
| Fe | 0.4 | 1.6 | 2.0 | 6.3 | 5.8 | 13.2 |
| | µg/L | | | µg/kg | | |
| Pb | 0.2 | 1.6 | 2.0 | 859.2 | 37.2 | 9.7 |

[a] STP = tailings, SRP = waste rock, CR = crushed waste rock.
[b] Values below instrument detection limits.

Fig. 11

TREATMENT AND PREVENTION SYSTEMS FOR ACID MINE DRAINAGE AND HALOGENATED CONTAMINANTS

CROSS-REFERENCES TO RELATED APPLICATIONS

This application is the U.S. National Stage of international patent application No. PCT/US2008/068396, filed Jun. 26, 2008, which claims the benefit of U.S. Provisional Application No. 60/937,455 filed Jun. 26, 2007, each hereby incorporated by reference herein.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of DOE #DE-FC26-98FT40322 awarded by the Department of Energy.

TECHNICAL FIELD

Generally, the present invention may relate to treatment of mine wastes (e.g., acidic wastewater, water with high metal concentrations, mining rock heaps, mining sludge, or the like), halogenated contaminates, metals in oxidized form, and the like. Specifically, the present invention may relate to methods and apparatus regarding biological source treatments of acid mine wastes, halogenated contaminants, metals in oxidized form, and the like perhaps even using packaged products. Other embodiments may include prevention of the production of acid in wastewater perhaps by treatment of potential acid mine source materials and the like.

BACKGROUND OF THE INVENTION

Acid mine drainage is a prevalent environmental issue throughout the world stemming from historic and active coal and hard rock mining activities. One issue, especially with historic sites, is how the waste material was handled and the location of the waste disposal sites. For instance, this waste material was usually just piled up on the surface near the mine site where it is susceptible to oxidative weathering and drainage into nearby streams. Much of this waste material may be composed of sulfidic ore as pyrite ($FeS_2$) or other metal-sulfides that can oxidize and dissociate into sulfate and protons (acidity) when exposed to dissolved oxygen in water, thus, lowering the pH of the surrounding environment. This oxidation reaction and the dissolution of more minerals may be exacerbated by the presence of acidophilic *Acidithiobacillus ferrooxidans*, which may catalyze the oxidation of these metal sulfide minerals and result in even more acid mine drainage generation. As the most visual form of mine wastes, acid mine wastewater may contaminate watersheds with elevated concentrations of heavy metals and acidic waters, posing significant threats to the environment and human health. Acid mine wastewater may include, but is not limited to, acid mine drainage, mineral mine drainage, heavy metal containing effluent, and the like. Acid mine wastewater may be formed through an oxidation of metal sulfides, which may result in a release of protons (acidity) and hazardous metals.

Past methods used to treat exposed mine waste may include removal of the material and storing it in a secure location or perhaps even capping the material in place with impermeable or even semi-permeable barriers designed to eliminate airborne dust and reduce water infiltration into the pile and subsequent acid mine drainage generation. These caps may be composed of a variety of materials that range from cementitious capping materials to living blankets of acid/metal-tolerant grass, shrub, and tree species growing on thin layers of clay and top soil on top of the waste material. Other treatments for acid mine wastewater may include using minerals such as limestone to neutralize acidic water; utilizing natural processes (sulfate reducing activity) in ponds and wetlands; and perhaps treating acid mine wastewater using various bioreactors that dominantly utilize the activity of sulfate reducing bacteria. Yet, other past treatments may include use of microorganisms to reduce sulfate into sulfide resulting in metal-sulfide precipitates and proton consumption.

Reductive degradation, such as reductive dechlorination is a biological process that is used to describe certain types of biodegradation of oxidized metals, solvents, perhaps even chlorinated solvents, and the like in groundwater. Various chlorinated compounds such as but not limited to tetrachloroethylene, trichloroethylene, other chlorinated aliphatic hydrocarbons, aromatic hydrocarbons, and the like in groundwater can be biodegraded by naturally occurring bacteria. This may occur when other bacteria, perhaps even anaerobic bacteria, present in a contaminated site take electrons from organic compounds (the "electron donors") and produce $H_2$. Dechlorinating bacteria may use the electrons in the $H_2$ to replace a chlorine atom in the compounds. If the site soil and groundwater contain organic electron donors, this process can proceed until all of the chlorine atoms, or other halogens, are removed. TCE may be dechlorinated via dichloroethene and vinyl chloride to ethylene gas, a harmless end-product. Other solvents, such as 1,1,1-TCA and carbon tetrachloride, can also be degraded by reductive dechlorination.

SUMMARY DISCLOSURE OF THE INVENTION

Embodiments of the present invention may include methods and treatments for the prevention of acid mine drainage perhaps including forming a protective biofilm over acid mine drainage generation source materials. Other embodiments of the present invention may include treatments of contaminated water perhaps including injection of specific substrates to enhance reductive degradation of the contaminants in the contaminated water.

It is therefore an object of the present invention, in embodiments, to provide treatment of mine wastes, including wastewater, contaminants, metals or the like.

It is therefore another an object of the present invention, in embodiments, to provide a packaged treatment product for the treatment of mine wastes, including wastewater, contaminants, metals or the like.

Naturally, further objects, goals and embodiments of the inventions are disclosed throughout other areas of the specification and drawings.

BRIEF DESCRIPTION OF THE DRAWINGS

FIG. 10 shows a microcosm treatment matrix based on an experiment.

FIG. 11 shows a chemical characterization of water for sample characterization data.

MODES FOR CARRYING OUT THE INVENTION

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

In embodiments, a biological source treatment technique may treat acid mine drainage, acid mine wastewater, or even other types of contaminated water perhaps at a source through injections of substrate and perhaps even microbial inoculum injections. Generally, biological source treatment techniques may be used to treat acid mine drainage at a source by establishing a biofilm or perhaps even a biofilm-mineral mixture on source materials that may neutralize existing acidity and may prevent fresh oxidation of acid generating minerals.

As discussed above, acid mine drainage may occur from coal and hard rock mining activities and the like. A treatment location site may include but is not limited to hard rock mines, backfilled coal mining waste, backfilled mining waste, waste rock piles, copper mines, gold mines, lead mines, silver mines, coal mines, and the like. In embodiments, a treatment location site may include at least one acid mine drainage generation source. An acid mine drainage generation source may be identified at a treatment location site with an acid mine drainage generation source identifier. Identification may include human evaluation, site survey methods, electromagnetic induction surveys, ground electromagnetic induction surveys, air electromagnetic surveys, and the like. Utilization of electromagnetic induction surveys, sometimes referred to as EM mapping, may determine areas of low resistance in a treatment location site and may even measure changes in subsurface resistivity throughout a site. Low resistance may be an indication of acid mine drainage generation source material. Accordingly, EM mapping may provide valuable information in potential hotspots and perhaps even acid mine drainage plume movement within a site. From an identification of an acid mine drainage generation source, at least one treatment area may be determined as optimal for administering a treatment injection. As such, at least one injection well may be installed in the treatment areas.

Figure 1:
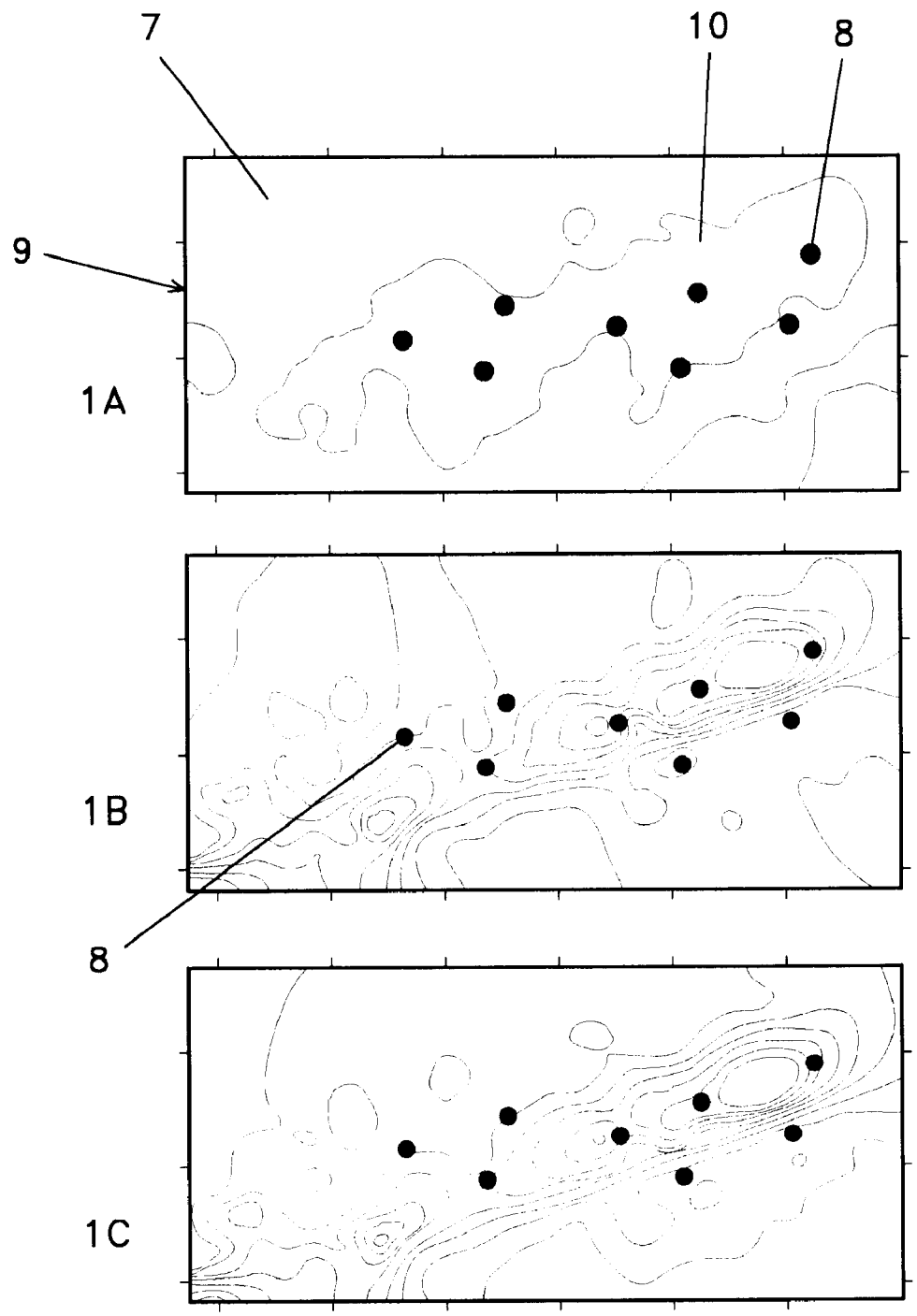
FIGS. 1A, 1B, and 1C are examples of an electromagnetic induction survey showing resistivity changes of a treatment location site.

In embodiments, it may be desirable to monitor acid mine drainage generation sources in a treatment location site after receiving at least one treatment injection. Monitoring may include electromagnetic survey mapping of a treatment location site at various time intervals after a treatment injection has been administered. As an example, FIGS. 1A, 1B, and 1C show examples of an electromagnetic induction survey (9) at a treatment location site (7). These figures show a relative change in resistivity over 6 months after encompassing a first and second round of biological source treatment injections based on 400 Hz vertical planar electromagnetic surveys at a depth of 40 m. Locations on numbered monitoring wells (indicated by a white "x") and injection wells (8) (indicated with a white or black circle) are shown. FIG. 1A is an initial ground electromagnetic ("EM") survey 6 months after a first round of biological source treatment injections, FIG. 1B is a second EM survey 6 months after the initial ground survey and approximately 2-3 months after a second round of biological source treatment injections, and FIG. 1C is the difference in resistance between the first and second surveys. The darkest area of FIG. 1A indicates low resistance and may represent an acid mine drainage generation source (10).

Embodiments of the present invention may provide injection of at least one substrate into at least one treatment area of an acid mine drainage generation source. Injections and injection samples may be administered by an up-gradient, downhole injection, a gravimetric injection, and the like injection methods. A substrate and perhaps even a biofilm inducing substrate injection sample may include but is not limited to a carbon source, a dairy product, returned milk, milk, lactate, whey, ice cream, acetate, chitin, crustacean exoskeleton, corn syrup, vegetable oil, grease, kitchen grease, brewery wastes, carbohydrates, fats, proteins, industrial waste, combinations thereof, and the like. A substrate and perhaps even a biofilm inducing substrate injection sample may be a liquid, a concentrated liquid, a solid, a dried solid, a freeze-dried solid, combinations thereof, and the like.

Returned milk may include lactose, triglycerides, proteins, and the like which may provide necessary elements to at least one kind of microbial population to create a protective biofilm. Returned milk may include spoiled milk, ice cream, milk, and the like and may even be old milk that has past its expiration date and has been returned to a dairy. Use with returned milk as a substrate may provide an inexpensive and recyclable option since it may provide new uses of waste products. Returned milk may be high in organic carbon and it may be easy to concentrate. Returned milk may provide the nutrients and vitamins that may be beneficial to microbial growth or perhaps even any kind of biological growth. There may even be some beneficial microorganisms in the milk itself that may make up a good portion of a microbial community of a protective biofilm, as further discussed below.

In embodiments, one injection of substrate may be sufficient to treatment of acid mine drainage. However, in other embodiments, it may take multiple substrate doses or perhaps even multiple biofilm inducing substrate injection samples to treat an acid mine drainage generation source.

As one non-limiting example, an amount of carbon source which may be injected into a treatment area of an acid mine drainage generation source may include but is not limited to a 2 to 1 ratio of organic carbon to water extractable sulfate concentration of waste material; a 3 to 1 ratio of organic carbon to water extractable sulfate concentration of waste material; a 4 to 1 ratio of organic carbon to water extractable sulfate concentration of waste material; a 5 to 1 ratio of organic carbon to water extractable sulfate concentration of waste material; a 6 to 1 ratio of organic carbon to water extractable sulfate concentration of waste material, and the like ratios. A water extractable sulfate may be an amount of sulfate that can be extracted from a given amount of source material using a mild extraction method such as but not limited to mixing in deionized water for about 12 to about 24 hours. Of course, any ratio may be used and all options are meant to be included in this disclosure.

Alternatively, an amount of carbon may include but is not limited to a 2:1 ratio of moles of carbon consumed to moles of sulfate reduced; a 3:1 ratio of moles of carbon consumed to moles of sulfate reduced; a 4:1 ratio of moles of carbon consumed to moles of sulfate reduced; a 5:1 ratio of moles of carbon consumed to moles of sulfate reduced; a 6:1 ratio of moles of carbon consumed to moles of sulfate reduced, and the like ratios. When bacteria, perhaps even sulfate-reducing bacteria, consume carbon they may use 1 mole of sulfate ($SO_4^{2-}$) as a terminal electron acceptor (perhaps the same way aerobic bacteria use oxygen) for every 2 moles of carbon they consume. Reduce, in this case, may include chemically reducing by gaining an electron. Since there may be other kinds of bacteria species in a biofilm which may not be using sulfate as an electron acceptor but may be using carbon as a food source, the dosage here may vary. Of course, any ratio may be used and all options are meant to be included in this disclosure.

Figure 2:
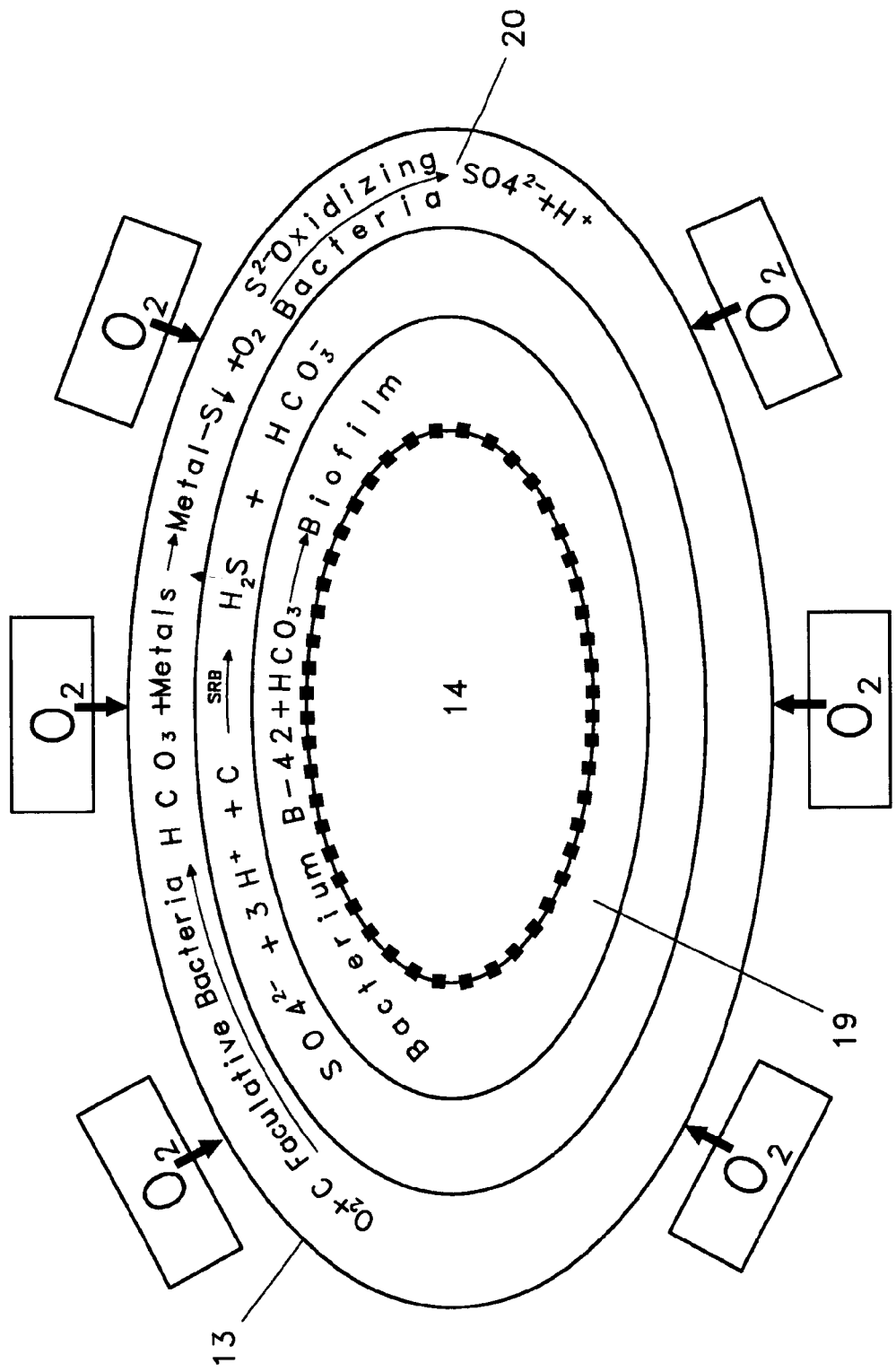
FIG. 2 is an example of a protective biofilm in accordance with embodiments of the present invention.
Figure 4A:
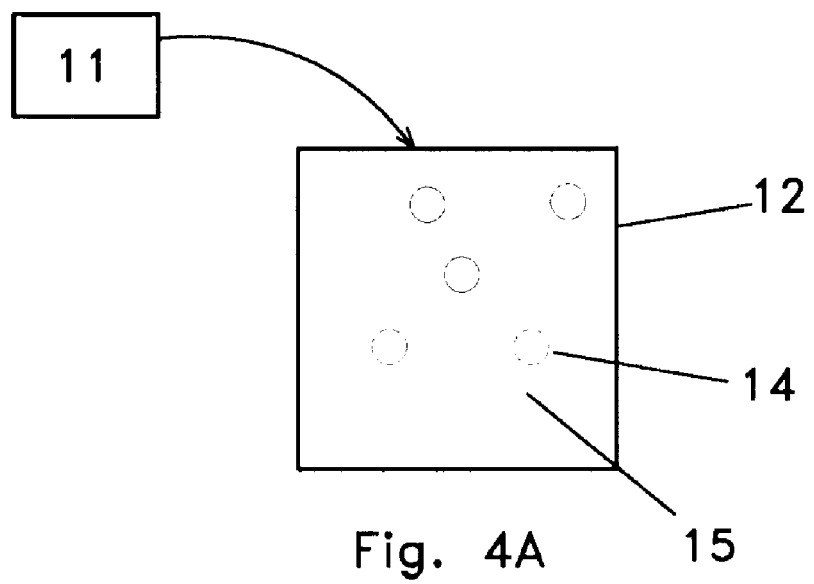
FIGS. 4A and 4B are examples of acid mine drainage generation source treatments and contaminated water environment treatments, respectively, in accordance with embodiments of the present invention.

Once a substrate may be injected into an acid mine drainage generation source (12), at least some of the substrate may be biologically consumed by at least one kind of microbial population and a protective biofilm (13) may be biologically constructed over a plurality of acid mine drainage generation source materials (14) as can be understood from FIGS. 2 and 4A. A microbial population may consume a substrate perhaps by breaking down the substrates into smaller molecules. A microbial population may be an indigenous microbial population located in an acid mine drainage generation source, or in other embodiments, microbial populations may be newly injected, perhaps even only a single injection of a newly injected microbial population, into a treatment area of an acid mine drainage generation source.

Examples of microbial populations may include but are not limited to metal-reducing bacteria, sulfate-reducing bacteria, methanogenic bacteria, facultative anaerobes, site specific species, bacteria found in a substrate, aerobic bacteria, anaerobic bacteria, facultative anaerobic bacteria, sulfate reducing bacteria, obligate anaerobic bacteria, cow teat bacteria, metal-tolerant denitrifier bacteria, sulfur-loving fermenter bacteria, *Desulfosporosinus* sp, sulfate reducing bacteria clone 159, *acidovorax avenae*, nickel tolerant denitrifier bacteria, facultative denitrifiers, uncultured bacterium clone B-42, combinations thereof, and the like.

In embodiments, it may be desirable to inject other components into a treatment area of an acid mine drainage generation source. Other components may include but are not limited to at least one nutrient perhaps in a nutrient injection sample, a pH adjuster perhaps in a pH adjuster injection sample, reductant perhaps in a reductant injection sample, inoculum, and the like. Examples of nutrients may include but are not limited to nitrogen, phosphorus, iron, $Na_2HPO_4$, $NaH_2PO_4$, $NH_4Cl$, KCl, NTA (nitrilotriacetic acid), $MgSO_4$, $MnSO_4.H_2O$, NaCl, $FeSO_4.7H_2O$, $CaCl_2.2H_2O$, $CoCl_2.6H_2O$, $ZnCl_2$, $CuSO_4.5H_2O$, $AlK(SO_4)_2.12H_2O$, $H_3BO_3$, $Na_2MoO_4$, $NiCl_2.6H_2O$, $Na_2WO_4.2H_2O$, potassium compounds, magnesium compounds, calcium compounds, sodium compounds, trace amounts of metals, compounds of other cationic substitution for sodium, potassium, magnesium, calcium, and the like, combinations thereof, and the like. Examples of a pH adjuster may include but is not limited to lime, trona, carbonate, bicarbonate, enzymes, proteins, combinations thereof, and the like. Examples of a reductant may include but is not limited to NaS, cystein, organic substrates, combinations thereof, and the like. Organic substrates may indirectly serve as a reductant when they may oxidize and reduce an environment. Examples of an inoculum includes but is not limited to bacteria populations, ES inoculum, municipal sewage sludge, enriched ES inoculum, non-toxic media with microbial consortia, and the like.

Generally, an biofilm inducing substrate injection sample (11) which may include individual or perhaps even combined packaged injections of substrates, inoculum, nutrients, pH adjuster, reductant, additives, other components, and the like may be injected into an acid mine drainage generation source (12) having a plurality of acid mine drainage generation source materials (14) and a surrounding environment (15) as shown in FIG. 4A. When at least one microbial population consumes the injection sample, a protective biofilm may be created as shown in FIG. 2 and discussed in more detail below.

As an alternative embodiment, it may be desirable to inject a packaged product into a treatment area of an acid mine drainage generation source. A packaged product may include, individually or perhaps even in various combinations, a substrate or any other components as described herein. A packaged product may be specifically designed for a particular site and may have all of the needed ingredients combined in a single product. A packaged product may also include liquid, concentrated liquid, dried, freeze-dried, or the like substrates, inoculum injections, nutrients, pH adjusters, reductants, combinations thereof, and the like.

A protective biofilm which may be biologically constructed over acid mine drainage generation source materials may be a complex protective biofilm with a diverse microbial community. This complex protective biofilm may include microbial cells and perhaps even extracellular polymers. In embodiments, a diverse microbial community may have numerous different microbial species including but not limited to greater than about 50 different species, greater than about 70 different species, about 75 different species, greater than about 75 different species, and the like. In embodiments, a complex protective biofilm may include a multilayered community as shown in FIG. 2. A biofilm may have at least two layers, at least three layers, at least four layers, and the like. In embodiments, at least some facultative anaerobic bacteria may be found in an outermost layer (20) and perhaps even at least some obligate anaerobic bacteria may be found in an inner layer (19) of a multilayered community. Other kinds of bacteria which may be found in a complex biofilm may include but are not limited to aerobic bacteria, anaerobic bacteria, facultative anaerobic bacteria, sulfate reducing bacteria, obligate anaerobic bacteria, cow teat bacteria, metal-tolerant denitrifier bacteria, sulfur-loving fermenter bacteria, *Desulfosporosinus* sp, sulfate reducing bacteria clone 159, *acidovorax avenae*, nickel tolerant denitrifier bacteria, facultative denitrifiers, uncultured bacterium clone B-42, combinations thereof, and the like.

A protective biofilm (13) may include, in embodiments, a multilayered community with perhaps an outer layer (20) and an inner layer (19) coating an acid mine drainage generation source material (14). As can be understood from FIG. 2, oxygen ($O_2$) may surround a biofilm. Further, various reactions may occur in the layers of a biofilm as shown in FIG. 2. These are presented as non-limiting examples only.

Figure 3:
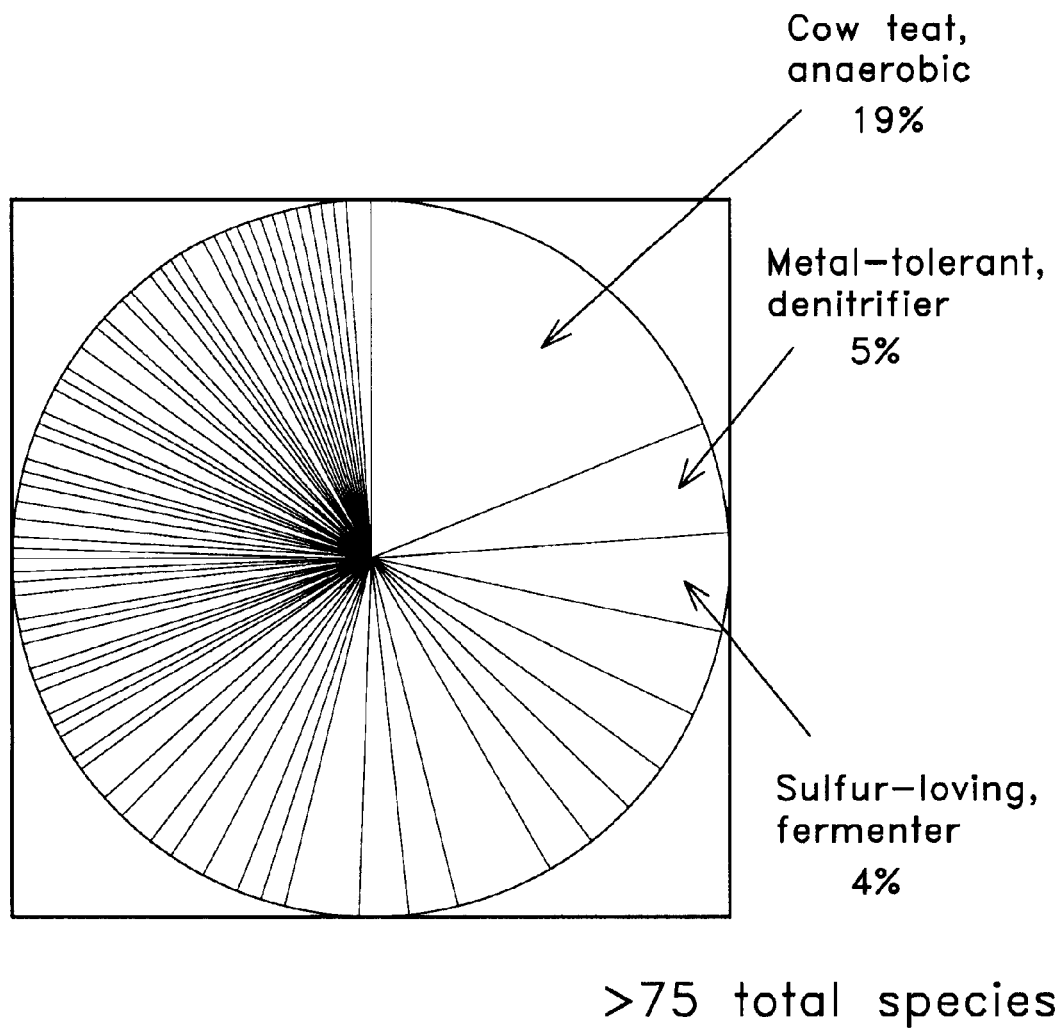
FIG. 3 is an example of a pie chart showing species frequency in a protective biofilm.

FIG. 3 shows a chart of the different kinds of species analyzed in a biofilm. As understood from the chart, facultative anaerobic bacteria, such as perhaps anaerobic bacteria from cow teat, may be a dominant species found in a biofilm. Other more dominant species may include metal-tolerant, denitrifying bacteria, and sulfur-loving, fermenter bacteria. Of course this figure represents only one example of the kinds of bacteria which may be found in an acid mine drainage biofilm.

A protective biofilm may prevent oxidation of acid mine drainage generation source materials by providing an oxidation prevention source and sulfuric acid generation prevention source. For example, interactions among the species in a diverse microbial community may result in physically preventing oxidation in an acid mine drainage generation source materials and perhaps even chemically preventing oxidation in an acid mine drainage generation source materials. A complex biofilm may have an oxygen-reducing capacity by providing an oxygen-reducing microbial barrier which may chemically consume oxygen before it can reach any acid mine drainage generation source materials and cause acid generation. A biofilm may form a hydrophobic physical barrier, perhaps due to exopolymer secretions in a biofilm, which could physically shield the acid mine drainage generation source materials from exposure to oxygen by eliminating contact between acid mine drainage generation source materials and oxygenated water. A biofilm may provide an anaerobic system around acid mine drainage generation source materials which creates an oxygen-free micro-environment surrounding an acid source even though the overlying water remains aerobic. The prevention of oxidation in acid mine drainage generation source materials may result in the prevention of sulfuric acid generation.

A protective biofilm may effectively scavenge all oxygen near the source materials and prevent oxidation and acid generation. In embodiments, a protective biofilm that may be established on the acid mine drainage generation source materials may provide an effective system to raise the pH of the surrounding environment and perhaps even prevent fresh acid generation. A surrounding environment may include water, wastewater, and the like. In embodiments, the present invention may provide attaining at least a circumneutral pH in a surrounding environment. This may include increasing a pH level from an acidic pH level to a circumneutral pH level or perhaps even maintaining a circumneutral pH level or perhaps even neutralizing sulfuric acid in an acid mine drainage generation source. An acidic pH level may include but is not limited to less than about 6 pH, less than about 5 pH, about 4.5 pH, about 2.5 pH, and the like. A circumneutral pH may include but is not limited to greater than about 6 pH, about 7 pH, greater than about 7 pH, about 7.2 pH, between about 6 pH and about 8.5 pH, and the like.

Acid mine drainage generation source materials may be any kind of material which can assist in or even produce sulfuric acid and contamination of environments including but not limited to iron sulfides, iron disulfide ($FeS_2$), FeS, metal sulfides, sulfidic ore, crushed ore, tailings pile, waste rock, combinations thereof, and the like.

In embodiments, a protective biofilm may include a permanent protective biofilm which perhaps can be maintained to prevent acid mine generation for a long period of time. Preventing sulfuric acid generation for a period of time may include but is not limited to at least about 3 months, more than about 1.8 years, more than about 2 years, about 6 months, about 9 months, about 12 months, about 18 months, more than about 19 months, about 24 months, about 3 years, about 5 years, about 10 years, and the like. Of course, any amount of time may be included perhaps even up to about 50 or up to about 100 years, and all are meant to be included in this disclosure.

Other embodiments of the present invention may include precipitating metals and perhaps even reducing iron concentrations in an acid mine drainage generation source.

Another category of common contaminants are halogenated compounds, such as perchloroethene, trichloroethylene, and perchlorate, which may remain recalcitrant in the environment. Most halogenated contaminants may be carcinogens and therefore may warrant immediate and effective clean-up remedies. Reductive dehalogenation may be applied in the biodegradation of halogenated compounds. When substrates are added to a halogen-contaminated water environment, dehalogenating microbes may catalyze a transfer of electrons from organic substrates to halogenated compounds, reducing them to less harmful intermediates and perhaps may eventually produce harmless end products. A number of microbial populations that may adapt to low redox environments have been identified as capable of catalyzing reductive dehalogenation. These bacteria may include but are not limited to: sulfate-reducing, methanogenic, dehalogenating species, and the like.

Yet, another category of common contaminants may include metals in oxidized form, such as hexavalent chromium (Cr (VI)), uranium (V), arsenate (As (V)), and the like, which may become extremely toxic to human and environmental health. These contaminants may be carcinogens and therefore may warrant immediate and effective clean-up remedies. Reductive immobilization or perhaps even reductive degradation may be applied in the biodegradation of oxidized metal compounds. When substrates are added to an oxidized metal contaminated water environment, microbes may catalyze a transfer of electrons from organic substrates to the oxidized metals, reducing them to immobilized precipitates. A number of microbial populations that may adapt to low redox environments have been identified as capable of catalyzing reductive immobilization. These bacteria may include but are not limited to: metal-reducing, sulfate-reducing, methanogenic bacteria, or the like.

Mechanism-wise, reductive immobilization may be similar to reductive dehalogenation. It may be desirable to provide cost-effective "natural" substrates that can facilitate reductive degradation of various kinds of contaminants. For example, a number of agricultural and dairy waste products can serve as ideal substrates for reductive dehalogenation. These substrates may include, but are not limited to: spoiled milk, whey, corn syrup, brewery waste, and the like. A biological source treatment technique can also be applied in reductive dehalogenation.

Figure 4B:
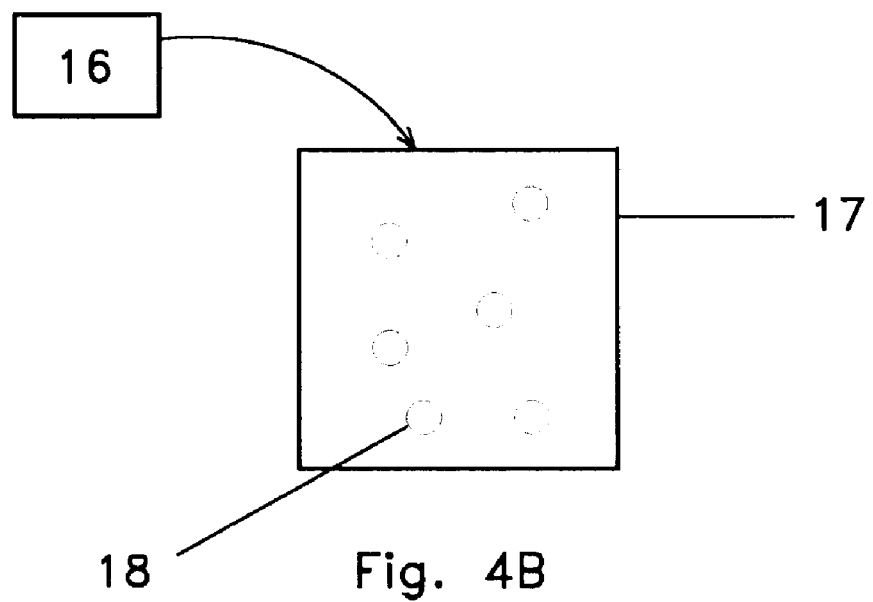
Figure 5A:
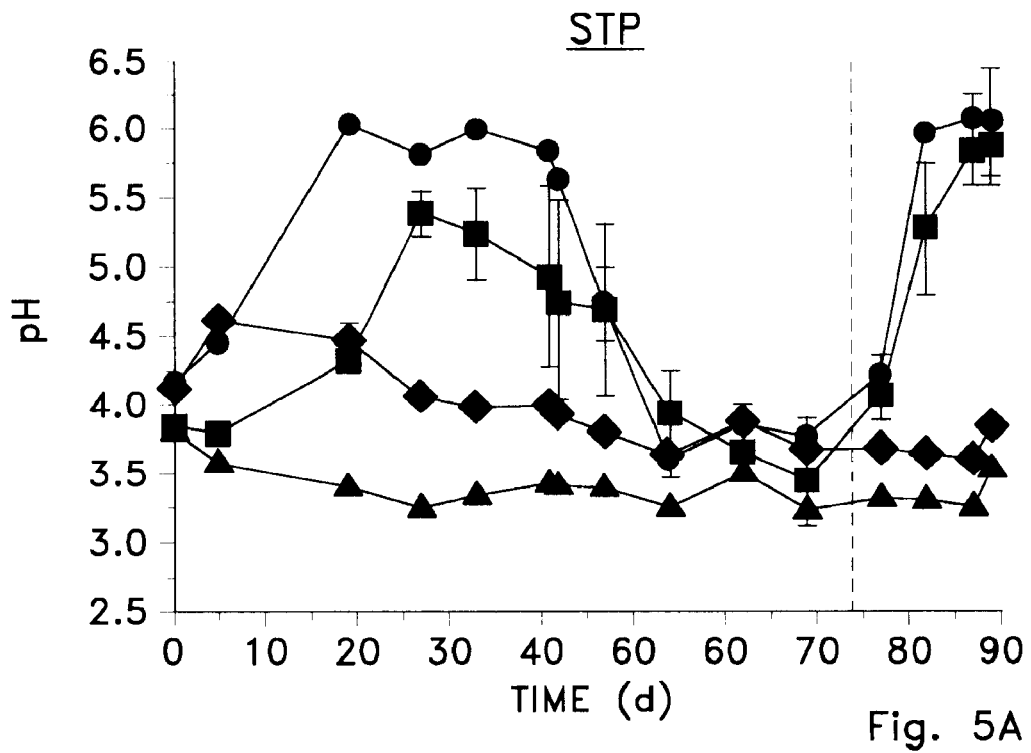
FIGS. 5A through 5F show water quality parameters monitored in microcosms containing waste material as discussed in the Study #1 feasibility test.
Figure 5B:
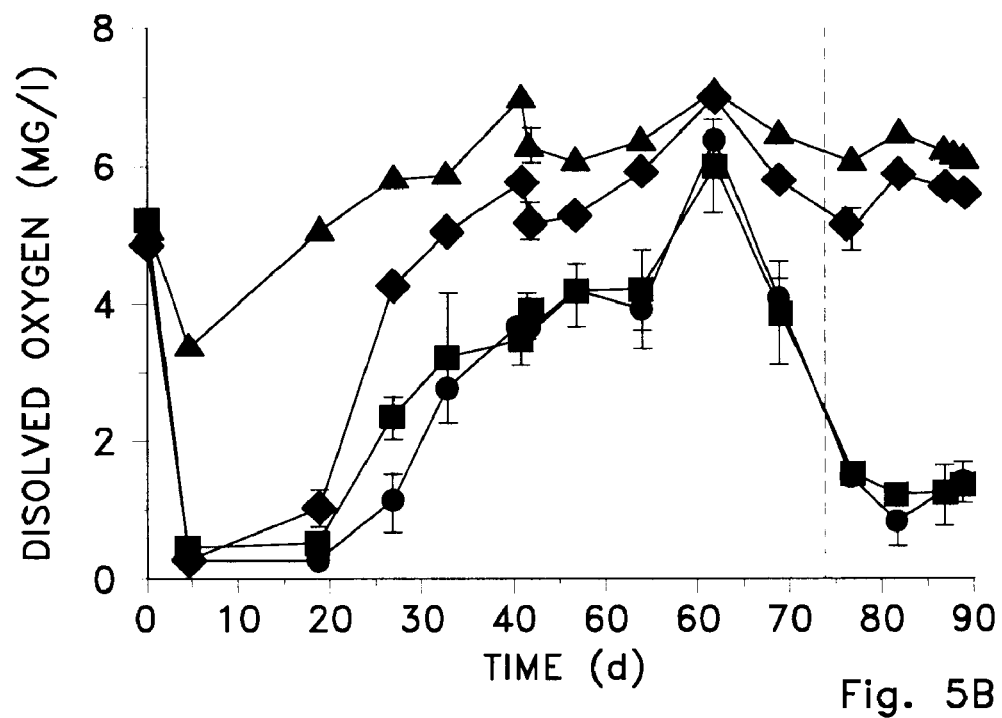
Figure 5C:
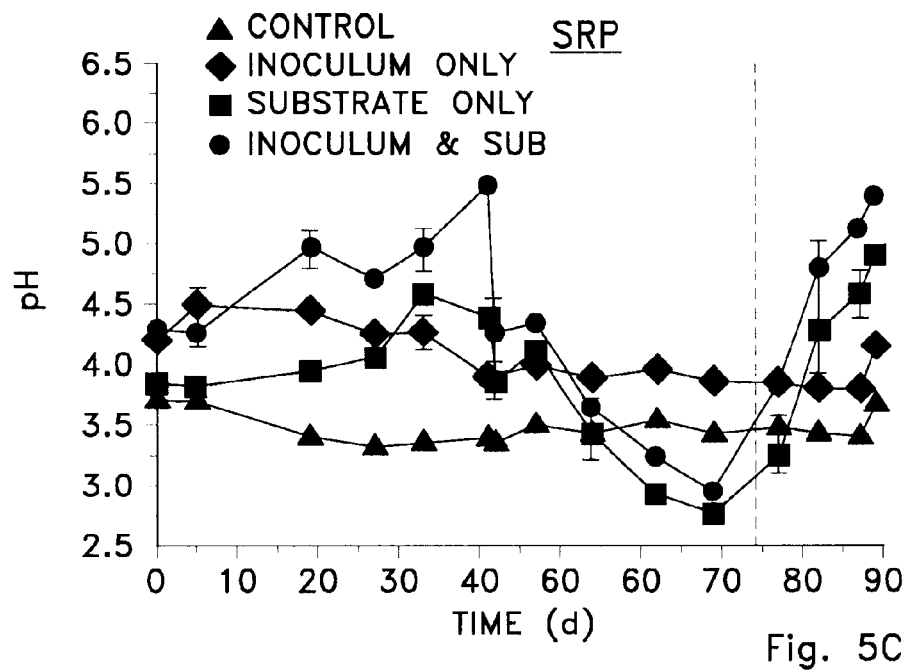
Figure 5D:
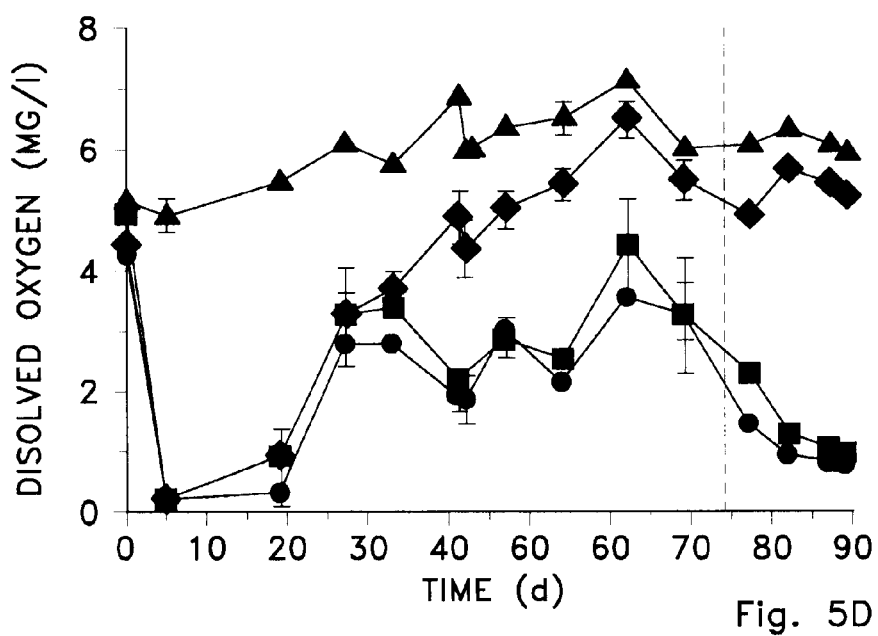
Figure 5E:
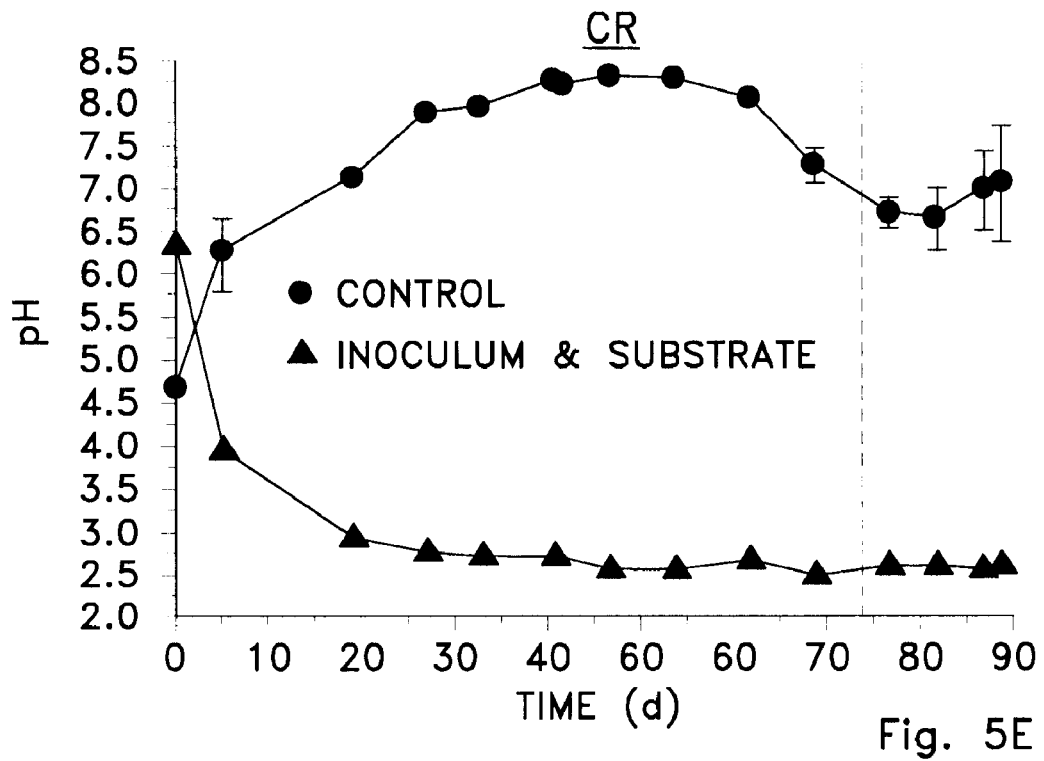
Figure 5F:
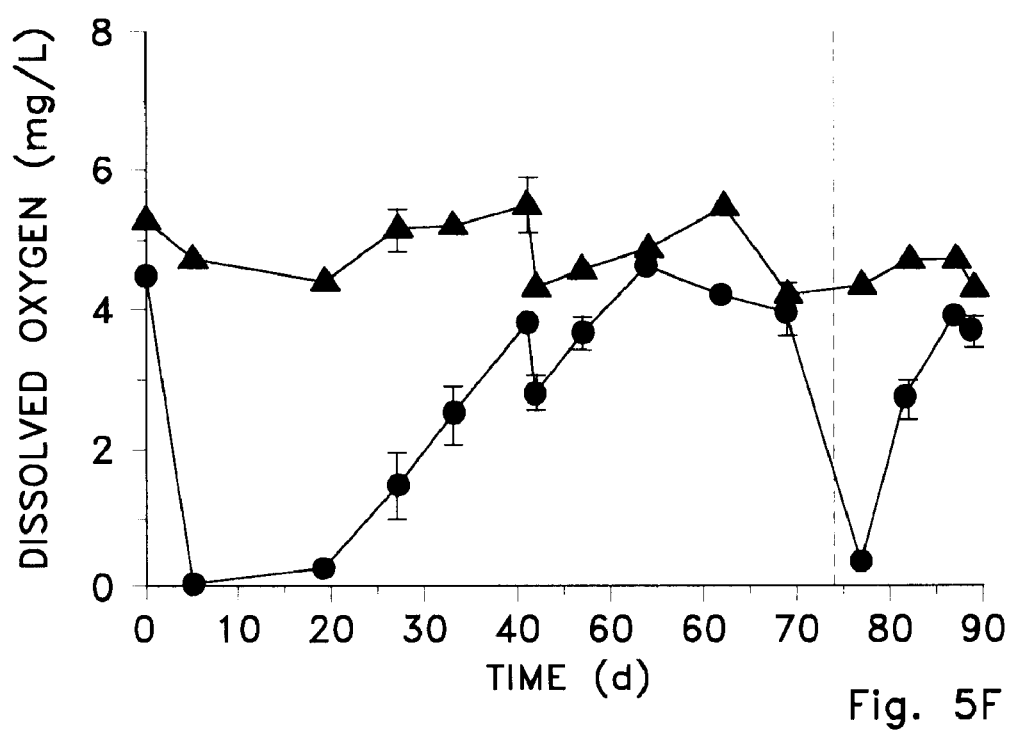

In embodiments, the present invention may provide a method and treatment of contaminated water. In general, an injection (16) of a substrate may be added to a contaminated water environment (17) having contaminants (18) as shown in FIG. 4B. Contaminants of a contaminated water environment may include but are not limited to halogenated compounds, oxidized metals, chlorinated alkenes, chlorinated alkanes, chlorinated aromatics, fluorinated alkenes, fluorinated alkanes, brominated alkenes, brominated alkanes, brominated aromatics, perchloroethene, trichloroethene, perchlorate, dichloroethylene, vinyl chloride, carbon tetrachloride, chlorobenzene, uranium, chromium, arsenate, combinations thereof, and the like. Treatment of a contaminated water environment may include the injection of substrates. In one embodiment, the injection of returned milk may provide enhanced reductive degradation of the contaminated water environment. As discussed herein, returned milk may be a liquid, concentrated liquid, solid, dried, freeze-dried, or the like. The substrate may provide an electron source to at least one population of bacteria, perhaps even an anaerobic bacteria population. This may cause degradation of the contaminant providing a harmless end-product. End-products may include immobilized precipitates such as when dealing with oxidized metal contaminants or the like.

Embodiments may provide an ex-situ or perhaps even an in-situ contaminated water environment. Further additives may be injected into a contaminated water environment perhaps with or in addition to a substrate injection. Additives may include but are not limited to organic substrates, nutrients, micro-metals, bacterial inoculum, pH adjuster, reductant, sulfate, ferrous iron, ferrous sulfate, combinations thereof, and the like. Organic substrates may include but are not limited to whey, ice cream, lactate, acetate, chitin, crustacean exoskeleton, corn syrup, vegetable oil, grease, kitchen grease, brewery wastes, carbohydrates, fats, proteins, industrial waste, combinations thereof, and the like. As discussed herein, nutrients may include but are not limited to nitrogen, phosphorous, ammonium phosphate, iron, combinations thereof, and the like. Bacterial inoculum may include but are not limited to metal-reducing bacteria, sulfate-reducing bacteria, methanogenic bacteria, facultative bacteria, site specified species, fermentative bacteria, dehalogenating bacteria, combinations thereof, and the like. A pH adjuster may include but is not limited to lime, trona, carbonate, bicarbonate, enzymes, proteins, combinations thereof, and the like. A reductant may include but is not limited to NaS, cystein, organic substrates, combinations thereof, and the like. As discussed herein, embodiments of the present invention may include injecting a packaged product into a contaminated water environment.

A biological source treatment application in the field may need to be feasible for industrial and governmental reclamation teams. For instance, many areas that may require treatment may have restrictions on injection of municipal waste into or even near groundwater systems. Additionally, in order to inject sufficient amounts of substrate, thousands of gallons may need to be injected into each treatment well. This could be a problem for a few reasons: (1) If access to injection wells is difficult, it may not be feasible to deliver multiple 3,000-gallon tanker loads of substrate and perhaps even a 3,000-gallon tanker load of inoculum to a field site; or (2) Availability of substrates, including but not limited to waste dairy products, may be inconsistent, insufficient, or perhaps even non-existent in some areas which may make use of a biological source treatment system infeasible perhaps due to a need for large volumes of liquid amendments which may not be easily stored.

Using these substrates, among others, for reductive degradation in the field may present similar challenges to those described for acid mine drainage and acid mine wastewater applications. In embodiments, a biological source treatment application for both acid mine drainage and reductive degradation may include but is not limited to mixing key nutrients and proper bacterial consortium, to perhaps significantly enhance degradation efficiencies.

In embodiments, the present invention may include development of a packaged product that has core and perhaps even extended recipes of constituents including but not limited to organic substrates, key nutrients, micro metals, capable bacterial consortium, combinations thereof, and the like. Of course, constituents may be adjusted and specifically designed for different cases of acid mine drainage, acid mine wastewater, reductive degradation, and the like uses.

One example of a packaged product or even a kit may include a liquid, solid, concentrated, dried or even freeze-dried mixture of organic substrates, nutrients and microbial inoculum. As discussed above, a broad spectrum of substrates are meant to be included in the scope of this patent application and may include but is not limited to: dairy products, dairy wastes, dairy byproducts, spoiled milk, whey, ice cream, lactate, acetate, chitin, crustacean exoskeleton, corn syrup, vegetable oil, used kitchen grease, brewery wastes, organic rich industrial waste, carbohydrates, fats, proteins, combinations thereof, and the like. A broad spectrum of nutrients are meant to be included in the scope of this application and may include but is not limited to nitrogen, phosphorous, iron, and the like. A broad spectrum of microbial inoculum are meant to be included in the scope of this application and may include but is not limited to sulfate reducing bacteria, facultative microbes, site specified species, and the like.

A packaged product may be packaged in an easily transportable and storable form which may include but is not limited to 40-lb bags, 250-lb super bags, or any size. In embodiments, some packaging may include storage of a liquid mixture, perhaps a liquid concentrate, or the like. In yet other embodiments, some packaging may include storage of dry mixtures and the like.

Some examples of other applications of packaged products may include but are not limited to: products which may be hydrated and mixed on site and even injected into contaminated areas; products used for remediation and prevention of acid mine drainage and other mining wastes; products for remediation of halogenated contaminants through reductive dehalogenation; and perhaps even products for direct or even facilitated immobilization of oxidized metals, and the like.

A packaged product may be conveniently produced, transported and applied for acid mine drainage, acid mine wastewater, reductive dehalogenation of halogenated compounds, immobilization of oxidized metal species in the environment, and the like. This technology may be innovative, practical, cost-effective, and perhaps even beneficial to both the environment and industries. The commercial market for this technology may be significant.

In some embodiments, acid mine treatments, contaminated water treatments, and the like treatments may further include the following non-limiting examples: a pH adjuster (e.g., lime, trona, or the like) for perhaps environments with low pH; addition of nitrogen, phosphorous, combinations thereof, and the like; exclusion of bacterial inoculum for perhaps environments with existing populations; addition of bacterial inoculum for perhaps environments without the necessary populations; reductants perhaps for oxidized sites; addition of sulfate for perhaps co-metabolism of DNAPLs if sulfate-reduction may be a chosen pathway and a site may be deficient of sulfate; and perhaps even addition of ferrous iron perhaps to precipitate high sulfide concentrations; combinations thereof', and the like.

Embodiments may include the following non-limiting example recipes (based on site specifics):

Example 1

Biological Source Treatment Recipe for Treating Acid Mine Drainage at an Abandoned Mine in Southeast US Acid mine drainage from this site requires 200 mM of substrate carbon for remediation. Nitrogen or phosphorous may not be necessary; however microbial populations may be low in the abandoned mine. There may not be a need for pH adjustment. Bacterial counts may be done on product prior to mixture. A biological source treatment recipe may include:

Dried Spoiled Milk: 10 g dried spoiled milk/L acid mine drainage

Bacterial Inoculum (either a dry or wet product): calculating a weight or volume of bacterial inoculum that yields 108 bacterial cells/g dried milk Example 2

Recipe for Treating Trichloroethylene ("TCE") Contaminated Groundwater in the Rocky Mountain Region of US The original groundwater contained TCE contamination and a large population of sulfate-reducing bacteria present. Sulfate reduction was chosen as pathway to remove TCE. Groundwater was initially low in sulfate, nitrogen, and phosphorous. The recipe may include:

Dried Spoiled Milk: 4 g Dried Milk/L groundwater
Ammonium Phosphate: 0.04 g ammonium phosphate/g dried milk
Ferrous Sulfate: 0.2 g ferrous sulfate/g dried milk Field study and laboratory test results include the following:
Study #1: Results of our laboratory feasibility testing of the biological source treatment system using waste material from the Sheldon Mine site near Prescott, Ariz., USA.

The Sheldon Mine Complex is a historic site located in the Prescott National Forest, Yavapai County, Ariz., approximately 13 km southeast of Prescott, Ariz. This was an active copper, gold, lead, and silver mine from 1863 to 1959. Currently there is a 4.5-acre waste rock pile adjacent to Rich Gulch Creek and a 2.5 acre tailings pile near Lynx Creek at the site, which are both sources of acid mine drainage resulting in acidic seepage high in cation, metal, and metalloid concentrations that flow into adjacent creeks. Reclamation work in the form of landform modification was attempted on the waste rock and tailings piles from 1975 to 1976 by the US Forest Service and the University of Arizona. Although these reclamation efforts decreased surface erosion at the sites, established vegetation, and improved the over all aesthetic value of the area, the landform designs illuminated fast surface runoff, which helps to prevent erosion but thereby causes increased infiltration into the piles.

Soil samples were collected aseptically from approximately 0.30 to 0.45 m below the ground surface and stored in large plastic Ziploc® baggies from 10 locations on SRP and 9 locations on STP at the site. Additionally, 7.5 L of water was collected for microcosm setup from Rich Gulch Creek upstream from where the creek runs adjacent to 4.5-acre waste rock pile and 0.5 L of water was collected for chemical analysis at the point where the creek first intersects 4.5-acre waste rock pile and near the middle of SRP where iron discoloration is very apparent in the creek. The creek water was stored in a cooler on ice and all samples were transported to Western Research Institute in Laramie, Wyo., USA Waste material samples were extracted using a 1:1 ratio of material:reverse osmosis water using mild agitation for 3 h. These extracts were analyzed for pH, electrical conductivity, and major anions (chloride ($Cl^-$), nitrate ($NO_3^-$), phosphate ($PO_4^{3-}$), and sulfate ($SO_4^{2-}$)). Composite samples were created using all 10 samples collected from the rock pile for a rock pile composite and all 9 samples collected from the tailings pile for a tailings pile composite. Additionally, large rocks collected at the base of the rock pile were crushed to 1 to 5 mm to create three distinct mine materials for further testing. Extractions from these three materials and the three water samples from Rich Gulch Creek were analyzed for pH, EC, major anions as described for the individual soil samples, major cations (calcium (Ca), magnesium (Mg), potassium (K), sodium (Na)), metals (iron (Fe), and lead (Pb)), and dissolved organic carbon. Anions were analyzed by ion chromatography on a DIONEX DX-100 ion chromatograph (Sunnyvale, Calif.). Cations and metals were analyzed by inductively coupled plasma-mass spectrometry (ICP-MS). Dissolved organic carbon was analyzed on a Shimadzu total organic carbon analyzer (Columbia, Md.). All anion samples were filtered to 0.2 μm and all other samples were filtered to 0.45 μm. Cation and metal samples were acidified (pH≦2) with trace-metal grade nitric acid ($HNO_3$) and dissolved organic carbon samples were acidified (pH between 2 and 3) with 2N HCl.

Microcosm Experiments
Saturated Experiments

Microcosms were established in 250-ml glass jars using 20 g of mine waste material (composite material from the rock pile, the tailings pile, or crushed rock and 100 ml of Rich Gulch Creek water. Various amendments were added to these microcosms including (1) a control microcosm with no amendments, (2) a microcosm with 3 wt % inoculum only (municipal effluent solids (ES) with 88% moisture content or a microbial enrichment originally inoculated with ES), (3) a microcosm with either wet or dry substrate only (returned milk, using a 4:1 molar ratio of carbon:water-extractable sulfate), and (4) a microcosm with both inoculum and substrate. All amendments were added to the microcosms at the beginning of the experiment and all 16 treatments were replicated 3 times for a total of 48 microcosms (see FIG. 10). Due to the relatively remote location of the Sheldon Mine we used both wet and dry milk and two inoculum types (ES and ES enrichment) to test for an alternative substrate/inoculum the may be less expensive to transport and could be stored for longer periods at the site. The ES enrichment inoculum was generated by adding 5 g of ES to 3 L of whole milk and aerating the mixture for 6 d. After 6 d the liquid was centrifuged and the pellet was collected and stored in at 4° C. until it was used to inoculate the microcosms.

The top of each microcosm was loosely covered with aluminum foil with a small hole in the middle to allow interaction of the overlying water with ambient air. The pH, temperature, and dissolved oxygen (DO) in each microcosm was monitored at least weekly.

Wet/Dry Cycle Experiments

The purpose of this experiment was to determine if the BST technique and the resultant biofilm would be viable if a treated area dried out and was later re-saturated with water. Additional microcosms were established similarly to the Saturated Experiments except only 5 g of mine waste material (rock pile or tailings pile) and 25 ml of RGC-1 water were used in a control treatment and a substrate (milk) and inoculum (ES) treatment. These treatments were monitored for pH, temperature, and DO. The liquid in each microcosm dried up after approximately 28 d, was allowed to remain dry for 18 d, after which time they were re-saturated with RO water, monitored for 16 d until dry again from which time they remained dry for 26 d, were re-saturated with RO water, and were monitored for 3 more days.

Results
Sample Characterization

FIG. 11 contains all site sample characterization data. Of particular interest to this project are the elevated sulfate concentrations (which are key to acid mine drainage generation), the low dissolved organic carbon concentrations, and extremely low or non-existent $NO_3^-$ and $PO_4^{3-}$ concentrations (which are all insufficient for robust microbial growth).

Saturated Experiments

Figure 6A:
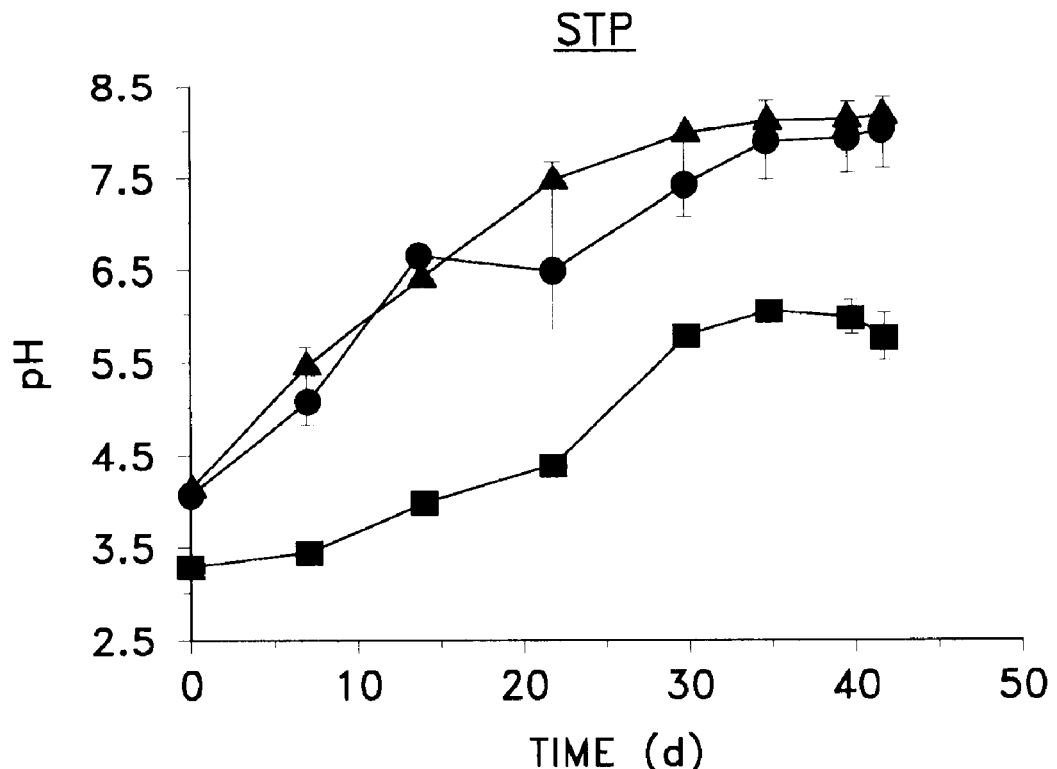
FIGS. 6A and 6B show changes in pH in microcosms containing waste material as discussed in the Study #1 feasibility test. The dashed vertical line indicates when the microcosms containing substrate were re-dosed.
Figure 6B:
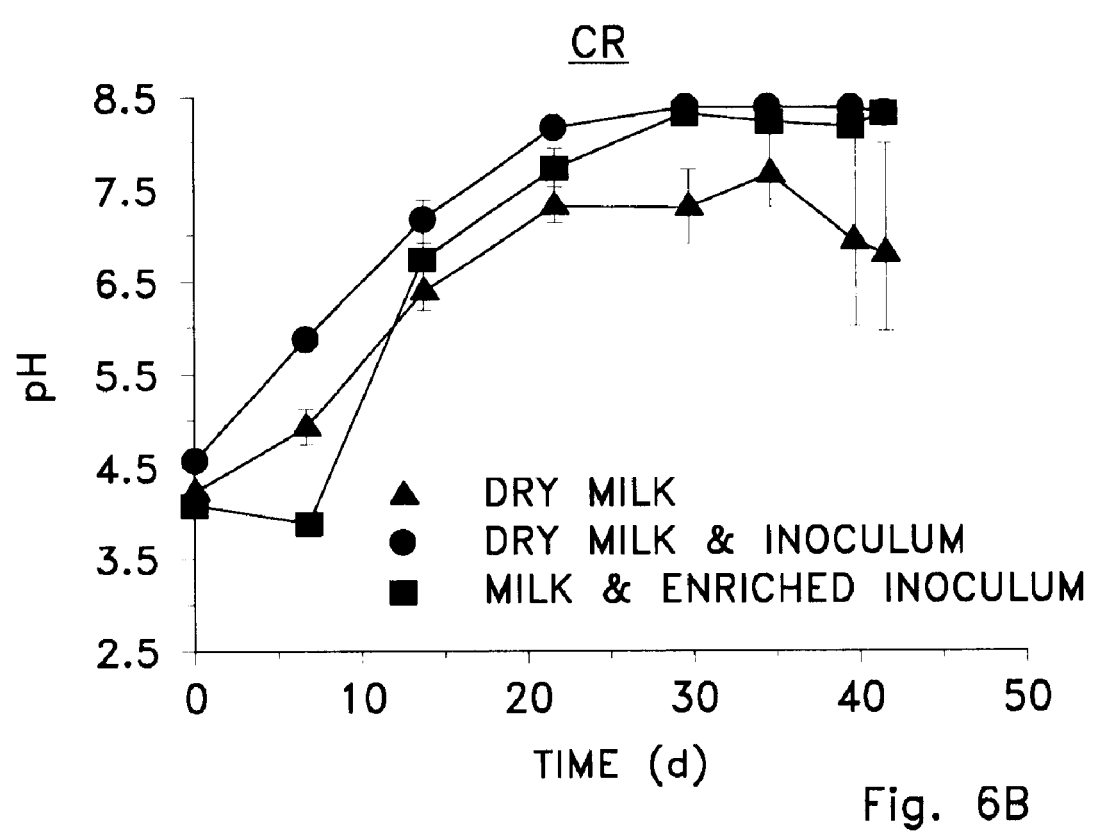

The addition of substrate only or substrate and inoculum raised the pH in all treatments from ~4.0 to as high as 5.5 with the rock pile material, 6.0 with the tailings pile material, and 8.0 with the crushed rock material. The pH in the inoculum only treatments did not exceed 4.5 and the pH in the controls decreased to as low as 2.5 over the course of the 90-d experiment (see FIG. 5). After about 40 d the pH in the treatments receiving substrate decreased and needed to be re-dosed with additional substrate. After re-dosing, the pH quickly increased to circum-neutral levels (see FIG. 5). There was little difference between the dry and wet milk substrates and the ES and ES enrichment inoculum treatments (see FIG. 6). Dissolved oxygen concentrations decreased substantially following amendment addition in all treatments and then slowly returned to control concentrations of ~6.0 mg/L (see FIG. 5). The temperature in all treatments remained at 18.0° C. (±1.9; n=586).

Wet/Dry Cycle Experiments

Figure 7A:
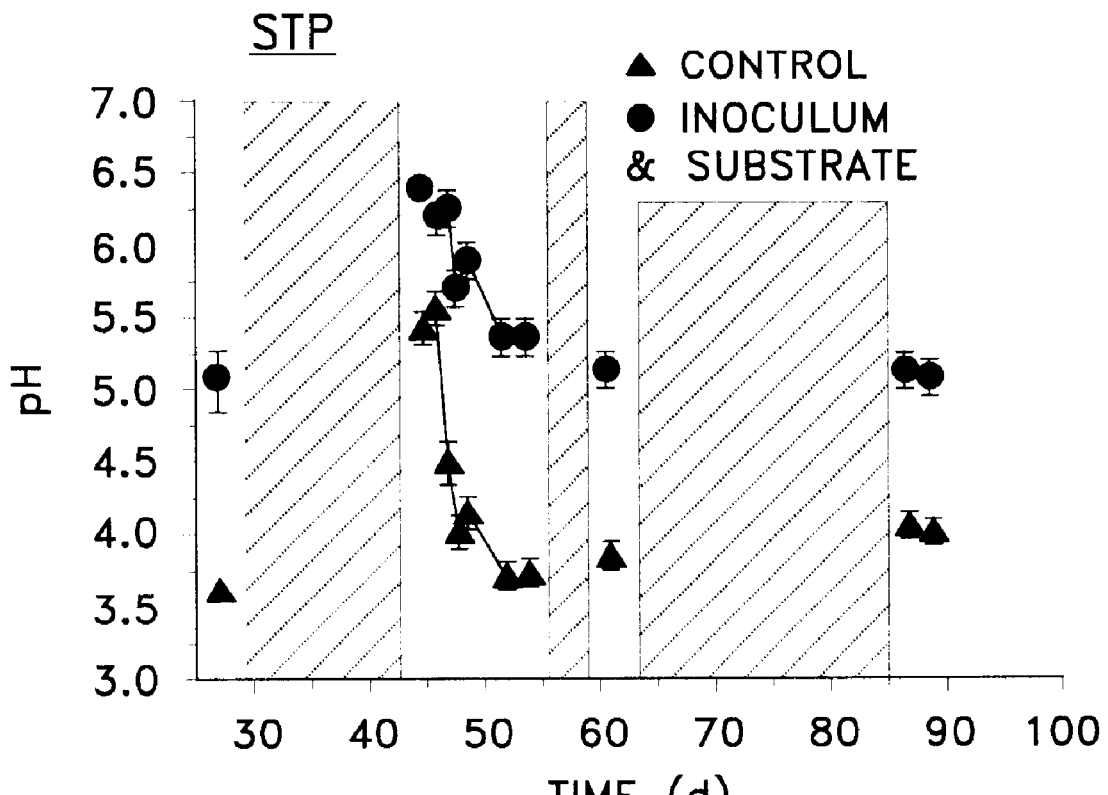
FIGS. 7A and 7B show changes in pH in microcosms containing waste material treated as discussed in the Study #1 feasibility test. The shaded bars indicate periods when the microcosms were dry.
Figure 7B:
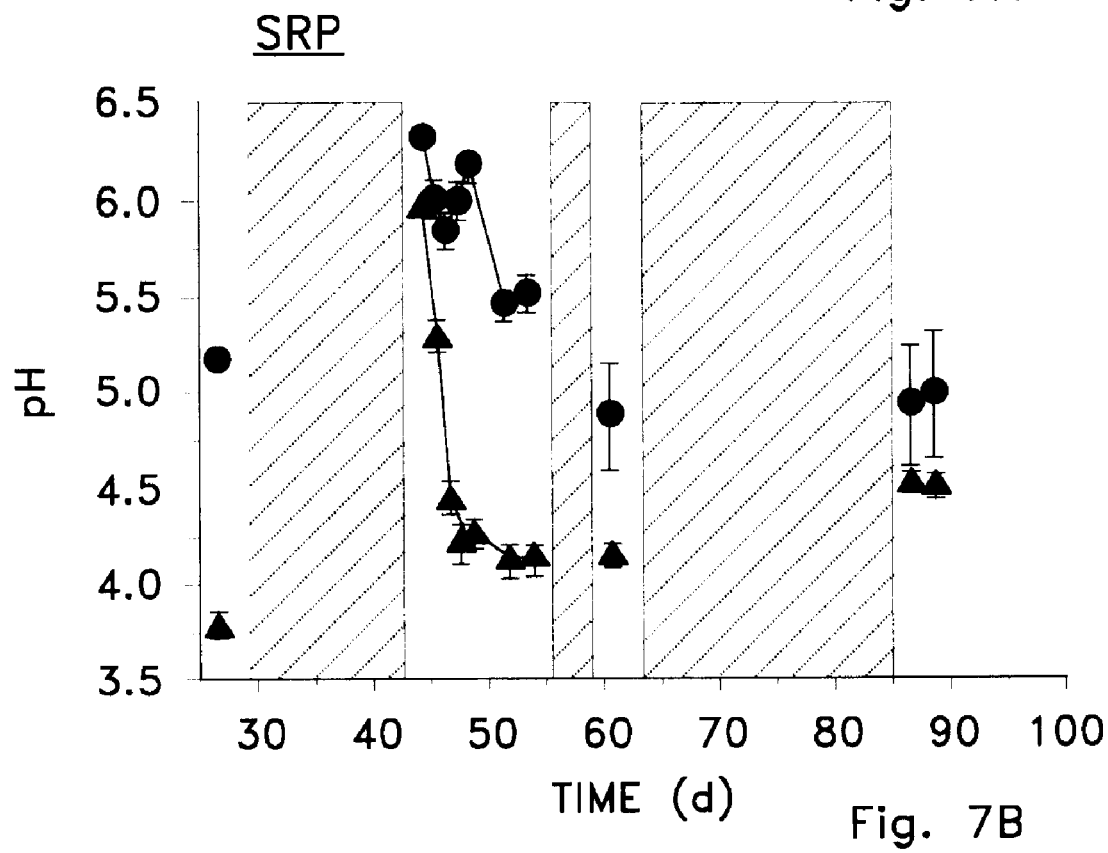

After 27 days, the pH in the wet/dry microcosms that received substrate and inoculum was between 5.1 and 5.2 while the pH in the control microcosms was between 3.6 and 3.8. Following a dry period of approximately 18 d and a rewetting with RO water, the pH in the amended treatments was 6.3 to 6.4 and the pH in the controls was 5.4 to 6.0, which reflected the pH of the RO water added (5.6). The pH in both treatments returned to pre-dry levels within 16 d at which time the microcosms were allowed to dry out and remained dry for 26 d. After this second dry period the microcosms were rewetted for a second time and the pH remained at pre-dry levels (see FIG. 7). The temperature in both treatments remained at 18.1° C. (±1.7; n=108).

Discussion

The results from these feasibility studies indicate our biological source treatment system can successfully prevent acid mine drainage generation from hard rock mine waste material. The pH of some of the treated microcosms decreased after about 40 d of treatment, showing a depletion of substrate, which was subsequently replenished with a second dose. We believe this rapid decrease in substrate may be an artifact due to the experimental setup, in which organic matter may be over-consumed by aerobic microbes in the highly oxygenated environment. Our previous experience with similar bench-scale tests and subsequent field applications suggests that the amended substrate and the performance of this treatment actually last much longer in the field (see, Jin, S., et al. Source treatment of acid mine drainage at a backfilled coal mine using remote sensing and biogeochemistry, Water Air Soil Pollut (2008) 188:205-212; published online: 7 Nov. 2007, hereby incorporated by reference), where dissolved oxygen concentrations and $O_2$ diffusion to the source material are much lower. Additionally, our previous work indicates the pH in microcosms remains very stable in the circum-neutral range following the second substrate addition (e.g., FIG. 2b from Jin, S., et al. Biological source treatment of acid mine drainage using microbial and substrate amendments: Microcosm studies; Mine Water Environ (2008) 27:20-30; published online 24 Nov. 2007, hereby incorporated by reference herein). Therefore, this rapid decline in substrate does not necessarily indicate that the treatment amendments will need to be reapplied after only 40 d in the field, and our experience demonstrates that the treatment can actually remain effective for ~3 years and counting.

The pH of the microcosms treated with substrate only and substrate and inoculum was significantly ($P \leq 0.001$) higher than control microcosms and microcosms treated with inoculum only for the tailings pile, the rock pile, and the crushed rock materials at the end of the 90-day experiments. The pH was not significantly different at the end of the experiment between the substrate only and substrate and inoculum treatments for the tailings pile materials but the pH was significantly ($P<0.001$) higher in the substrate and inoculum treatment, when compared to the substrate only treatment for the rock pile materials. This suggests that the indigenous microbial communities in the waste material and substrate may be sufficient for acid mine drainage prevention and additional microbial inoculation may not be necessary.

Figure 8:
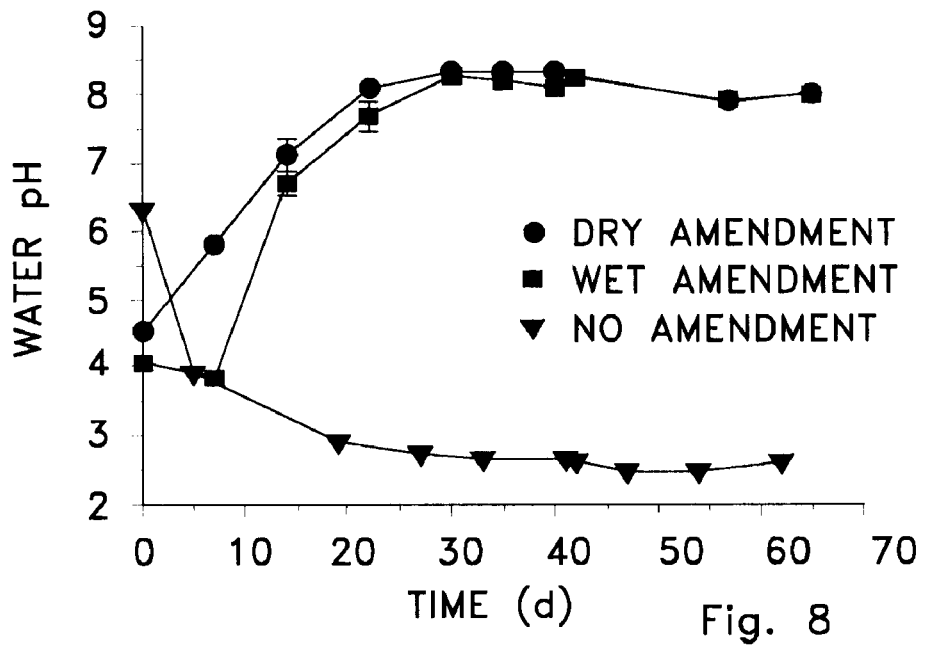
FIG. 8 shows changes in water pH during a test using various amendments with crushed waste rock.

Study #2: FIG. 8 shows results from changes in water pH during testing of various amendments with crushed waste rock. This graph shows changes in water pH in aerobic microcosms containing crushed waste rock from a historic gold mine in AZ and surface water (pH ~6.5) from the same site. Microcosms that received dry or wet amendments prevented acid rock drainage from occurring and eventually caused the pH to stabilize in the circum-neutral range. The amendments used in this trial was a carbon source substrate. The initial low pH value in dry and wet treatments was due to the low pH of the amendments (~4.5). The dry and wet treatments were dosed at a 4:1 molar ratio of organic carbon to the water-extractable sulfate concentration of the waste material. The decrease in pH in the no amendment control demonstrates the effects of waste rock oxidation, which generates acid rock drainage when no preventative treatment is applied. The final pH value of the dry amendment treatment was significantly ($P<0.001$) higher than the no amendment control based on ANOVA with a Bonferroni-adjusted alpha level of 0.005 to account for the time-series nature of these data. Error bars are ±the standard error of the mean (n=3).

Figure 9:
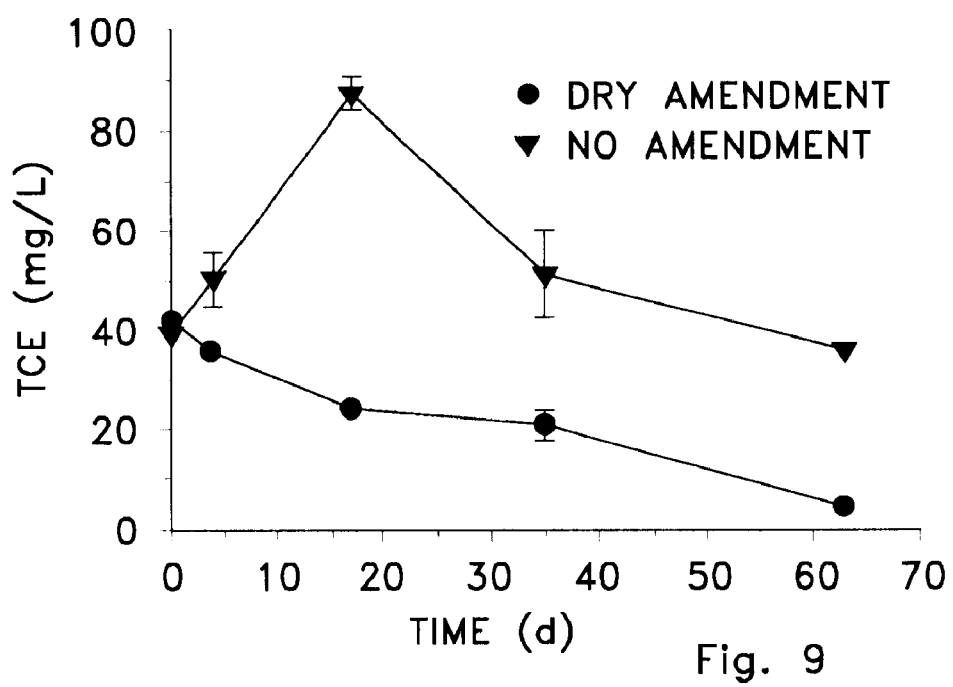
FIG. 9 shows TCE degradation in anaerobic microcosms containing TCE-contaminated groundwater.

Study #3: FIG. 9 shows TCE degradation in anaerobic microcosms containing TCE-contaminated groundwater collected from a site in WY that was spiked with additional TCE. The dry amendment treatment received 329 mg organic carbon/L. The increase in TCE in the no amendment control at the beginning of the test was likely due to delayed dissolution of the TCE spike. This increase was not observed in the dry amendment treatment because the rate of TCE degradation was faster than any TCE dissolution. This demonstrates that the dry amendment treatment enhances TCE degradation. The final TCE concentration of the dry amendment treatment was significantly ($P<0.001$) lower than the no amendment control based on ANOVA with a Bonferroni-adjusted alpha level of 0.01 to account for the time-series nature of these data. Error bars are ±the standard error of the mean (n=3).

Examples of alternative claims may include:

1. A method of preventing acid mine drainage comprising the steps of:
   identifying an acid mine drainage generation source at a treatment location site;
   locating at least one treatment area in said acid mine drainage generation source;
   injecting at least one substrate into said at least one treatment area of said acid mine drainage generation source;
   biologically consuming at least some of said at least one substrate by at least one kind of microbial population;
   biologically constructing a protective biofilm over a plurality of acid mine drainage generation source materials;
   preventing oxidation of said acid mine drainage generation source materials with said biofilm;
   preventing sulfuric acid generation in said acid mine drainage generation source; and attaining at least a circumneutral pH in a surrounding environment of said acid mine drainage generation source.

2. A method of preventing acid mine drainage according to claim 1 or any claim herein wherein said step of injecting said at least one substrate into said at least one treatment area of said acid mine drainage generation source comprises the step of up-gradient, down-hole injecting said at least one substrate into said at least one treatment area of said acid mine drainage generation source.

3. A method of preventing acid mine drainage according to claim 1 or any claim herein wherein said step of injecting at least one substrate into said at least one treatment area of said acid mine drainage generation source comprises the step of gravimetrically injecting said at least one substrate into said at least one treatment area of said acid mine drainage generation source.

4. A method of preventing acid mine drainage according to claim 1 or any claim herein wherein said step of injecting said at least one substrate into said at least one treatment area of said acid mine drainage generation source comprises the step of injecting at least one carbon source into said at least one treatment area of said acid mine drainage generation source.

5. A method of preventing acid mine drainage according to claim 1 or any claim herein wherein said at least one substrate comprises a dairy product.

6. A method of preventing acid mine drainage according to claim 1 or any claim herein wherein said at least one substrate comprises returned milk.

7. A method of preventing acid mine drainage according to claim 5 or any claim herein wherein said dairy product is selected from a group consisting of milk, returned milk, lactate, whey, ice cream, and combinations thereof.

8. A method of preventing acid mine drainage according to claim 4 or any claim herein wherein said step of injecting said at least one carbon source into said at least one treatment area of said acid mine drainage generation source comprises the step of injecting an amount of said carbon source, said amount selected from a group consisting of:
a 2 to 1 ratio of organic carbon to water extractable sulfate concentration of waste material;
a 3 to 1 ratio of organic carbon to water extractable sulfate concentration of waste material;
a 4 to 1 ratio of organic carbon to water extractable sulfate concentration of waste material;
a 5 to 1 ratio of organic carbon to water extractable sulfate concentration of waste material; and
a 6 to 1 ratio of organic carbon to water extractable sulfate concentration of waste material.

9. A method of preventing acid mine drainage according to claim 4 or any claim herein wherein said step of injecting said at least one carbon source into said at least one treatment area of said acid mine drainage generation source comprises the step of injecting an amount of said carbon source, said amount selected from a group consisting of:
a 2:1 ratio of moles of carbon consumed to moles of sulfate reduced;
a 3:1 ratio of moles of carbon consumed to moles of sulfate reduced;
a 4:1 ratio of moles of carbon consumed to moles of sulfate reduced;
a 5:1 ratio of moles of carbon consumed to moles of sulfate reduced; and
a 6:1 ratio of moles of carbon consumed to moles of sulfate reduced.

10. A method of preventing acid mine drainage according to claim 1 or any claim herein wherein said at least one substrate is selected from a group consisting of acetate, chitin, crustacean exoskeleton, corn syrup, vegetable oil, grease, kitchen grease, brewery wastes, carbohydrates, fats, proteins, industrial waste, and combinations thereof.

11. A method of preventing acid mine drainage according to claim 1 or any claim herein wherein said step of injecting said at least one substrate into said at least one treatment area of said acid mine drainage generation source comprises the step of injecting a liquid substrate into said at least one treatment area of said acid mine drainage generation source.

12. A method of preventing acid mine drainage according to claim 11 or any claim herein wherein said liquid substrate comprises a concentrated liquid substrate.

13. A method of preventing acid mine drainage according to claim 1 or any claim herein wherein said step of injecting said at least one substrate into said at least one treatment area of said acid mine drainage generation source comprises the step of injecting a solid substrate into said at least one treatment area of said acid mine drainage generation source.

14. A method of preventing acid mine drainage according to claim 13 or any claim herein wherein said solid substrate is selected from a group consisting of dried and freeze-dried substrates.

15. A method of preventing acid mine drainage according to claim 1 or any claim herein wherein said step of injecting said at least one substrate into said at least one treatment area of said acid mine drainage generation source comprises the step of injecting a packaged product into said at least one treatment area of said acid mine drainage generation source.

16. A method of preventing acid mine drainage according to claim 1 or any claim herein wherein said step of injecting said at least one substrate into said at least one treatment area of said acid mine drainage generation source comprises the step of injecting multiple substrate doses in said at least one treatment area of said acid mine drainage generation source.

17. A method of preventing acid mine drainage according to claim 1 or any claim herein wherein said at least one kind of microbial population comprises at least one kind of indigenous microbial population located in said acid mine drainage generation source.

18. A method of preventing acid mine drainage according to claim 1 or any claim herein and further comprising the step of injecting a microbial inoculum into said at least one treatment area of said acid mine drainage generation source.

19. A method of preventing acid mine drainage according to claim 18 or any claim herein wherein said microbial inoculum comprises at least one new kind of microbial population.

20. A method of preventing acid mine drainage according to claim 1 or any claim herein wherein said at least one kind of microbial population is selected from a group consisting of metal-reducing bacteria, sulfate-reducing bacteria, methanogenic bacteria, facultative anaerobes, site specific species, bacteria found in said at least one substrate, and combinations thereof.

21. A method of preventing acid mine drainage according to claim 19 or any claim herein wherein said microbial population is selected from a group consisting of metal-reducing bacteria, sulfate-reducing bacteria, methanogenic bacteria, facultative anaerobes, site specific species, bacteria found in said at least one substrate, and combinations thereof.

22. A method of preventing acid mine drainage according to claim 1 or any claim herein and further comprising the step of injecting at least one nutrient into said at least one treatment area of said acid mine drainage generation source.

23. A method of preventing acid mine drainage according to claim 22 or any claim herein wherein said at least one nutrient is selected from a group consisting of nitrogen, phosphorus, iron, and combinations thereof.

24. A method of preventing acid mine drainage according to claim 22 or any claim herein wherein said at least one nutrient is selected from a group consisting of $Na_2HPO_4$, $NaH_2PO_4$, $NH_4Cl$, $KCl$, NTA (nitrilotriacetic acid), $MgSO_4$, $MnSO_4 \cdot H_2O$, $NaCl$, $FeSO_4 \cdot 7H_2O$, $CaCl_2 \cdot 2H_2O$, $CoCl_2 \cdot 6H_2O$, $ZnCl_2$, $CuSO_4 \cdot 5H_2O$, $AlK(SO_4)^2 \cdot 12H_2O$, $H_3BO_3$, $Na_2MoO_4$, $NiCl_2 \cdot 6H_2O$, $Na_2WO_4 \cdot 2H_2O$, potassium compounds, magnesium compounds, calcium compounds, sodium compounds, and combinations thereof.

25. A method of preventing acid mine drainage according to claim 22 or any claim herein wherein said at least one nutrient comprises trace amounts of metals.

26. A method of preventing acid mine drainage according to claim 1 or any claim herein and further comprising the step of injecting a pH adjuster into said at least one treatment area of said acid mine drainage generation source.

27. A method of preventing acid mine drainage according to claim 26 or any claim herein wherein said pH adjuster is selected from a group consisting of lime, trona, carbonate, bicarbonate, enzymes, proteins, and combinations thereof.

28. A method of preventing acid mine drainage according to claim 1 or any claim herein and further comprising the step of injecting a reductant into said at least one treatment area of said acid mine drainage generation source.

29. A method of preventing acid mine drainage according to claim 28 or any claim herein wherein said reductant is selected from a group consisting of NaS, cystein, organic substrates, and combinations thereof.

30. A method of preventing acid mine drainage according to claim 1 or any claim herein wherein said treatment location site is selected from a group consisting of hard rock mine, backfilled coal mining waste, backfilled mining waste, waste rock pile, copper mine, gold mine, lead mine, silver mine, and coal mine.

31. A method of preventing acid mine drainage according to claim 1 or any claim herein wherein said acid mine drainage generation source materials are selected from a group consisting of iron sulfides, iron disulfide ($FeS_2$), FeS, metal sulfides, sulfidic ore, crushed ore, tailings pile, waste rock, and combinations thereof.

32. A method of preventing acid mine drainage according to claim 1 or any claim herein wherein said step of biologically constructing said protective biofilm over said plurality of said acid mine drainage generation source materials comprises the step of biologically constructing a complex protective biofilm over said plurality of said acid mine drainage generation source materials.

33. A method of preventing acid mine drainage according to claim 32 or any claim herein wherein said complex protective biofilm comprises a diverse microbial community.

34. A method of preventing acid mine drainage according to claim 33 or any claim herein wherein said diverse microbial community comprises a number of different microbial species selected from a group consisting of greater than about 50 different species, greater than about 70 different species, about 75 different species, and greater than about 75 different species.

35. A method of preventing acid mine drainage according to claim 32 or any claim herein wherein said complex protective biofilm comprises a multilayered community.

36. A method of preventing acid mine drainage according to claim 35 or any claim herein wherein said multilayered community comprises layers selected from a group consisting of at least two layers, at least three layers, and at least four layers.

37. A method of preventing acid mine drainage according to claim 35 or any claim herein wherein said multilayered community comprises at least some facultative anaerobic bacteria in an outermost layer and at least some obligate anaerobic bacteria in an inner layer of said multilayered community.

38. A method of preventing acid mine drainage according to claim 33 or any claim herein wherein said diverse microbial community comprises bacteria selected from a group consisting of aerobic bacteria, anaerobic bacteria, facultative anaerobic bacteria, sulfate reducing bacteria, obligate anaerobic bacteria, cow teat bacteria, metal-tolerant denitrifier bacteria, sulfur-loving fermenter bacteria, *Desulfosporosinus* sp, sulfate reducing bacteria clone 159, *acidovorax avenae*, nickel tolerant denitrifier bacteria, facultative denitrifiers, uncultured bacterium clone B-42, and combinations thereof.

39. A method of preventing acid mine drainage according to claim 33 or any claim herein wherein said diverse microbial community comprises facultative anaerobic bacteria as a dominant species.

40. A method of preventing acid mine drainage according to claim 32 or any claim herein wherein said complex protective biofilm comprises microbial cells and extracellular polymers.

41. A method of preventing acid mine drainage according to claim 1 or any claim herein wherein said step of biologically constructing a protective biofilm over said plurality of acid mine drainage generation source materials comprise the step of biologically constructing a permanent protective biofilm over said plurality of acid mine drainage generation source materials.

42. A method of preventing acid mine drainage according to claim 1 or any claim herein wherein said step of identifying said acid mine drainage generation source at said treatment location site comprises the step of utilizing an electromagnetic induction survey.

43. A method of preventing acid mine drainage according to claim 42 or any claim herein wherein said electromagnetic induction survey is selected from a group consisting of a ground electromagnetic induction survey and an air electromagnetic induction survey.

44. A method of preventing acid mine drainage according to claim 42 or any claim herein and further comprising the step of monitoring said acid mine drainage generation source using said electromagnetic induction survey.

45. A method of preventing acid mine drainage according to claim 1 or any claim herein wherein said step of locating said at least one treatment area in said acid mine drainage generation source comprises the step of installing at least one injection well in said at least one treatment area of said acid mine drainage generation source.

46. A method of preventing acid mine drainage according to claim 1 or any claim herein wherein said step of attaining at least said circumneutral pH in said surrounding environment of said acid mine drainage generation source comprises the step of increasing a pH level in said surrounding environment of said acid mine drainage generation source.

47. A method of preventing acid mine drainage according to claim 46 or any claim herein wherein said step of increasing said pH level in said surrounding environment of said acid mine drainage generation source comprises the step of increasing said pH level from an acidic pH to a circumneutral pH.

48. A method of preventing acid mine drainage according to claim 1 or any claim herein wherein said circumneutral pH is selected from a group consisting of greater than about 6 pH, about 7 pH, greater than about 7 pH, about 7.2 pH, and between about 6 pH and about 8.5 pH.

49. A method of preventing acid mine drainage according to claim 47 or any claim herein wherein said acidic pH is selected from a group consisting of less than about 6 pH, less than about 5 pH, about 4.5 pH, and about 2.5 pH.

50. A method of preventing acid mine drainage according to claim 1 or any claim herein wherein said step of preventing sulfuric acid generation in said acid mine drainage generation source comprises preventing sulfuric acid generation for a period of time, said period of time is selected from a group consisting of at least about 3 months, more than about 1.8 years, more than about 2 years, about 6 months, about 9 months, about 12 months, about 18 months, more than about 19 months, about 24 months, about 3 years, about 5 years, and about 10 years, 51. A method of preventing acid mine drainage according to claim 1 or any claim herein wherein said step of preventing oxidation in said acid mine drainage generation source materials comprises the step of physically preventing oxidation in said acid mine drainage generation source materials.

52. A method of preventing acid mine drainage according to claim 51 or any claim herein wherein said step of physically preventing oxidation in said acid mine drainage generation source materials comprises the step of providing a hydrophobic physical barrier in said biofilm.

53. A method of preventing acid mine drainage according to claim 1 or any claim herein wherein said step of preventing oxidation in said acid mine drainage generation source materials comprises the step of chemically preventing oxidation in said acid mine drainage generation source materials.

54. A method of preventing acid mine drainage according to claim 53 or any claim herein wherein said step of chemically preventing oxidation in said acid mine drainage generation source materials comprises the step of providing an oxygen-reducing microbial barrier in said biofilm.

55. A method of preventing acid mine drainage according to claim 1 or any claim herein and further comprising the step of precipitating metals in said acid mine drainage generation source.

56. A method of preventing acid mine drainage according to claim 1 or any claim herein and further comprising the step of neutralizing sulfuric acid in said acid mine drainage generation source.

57. A method of preventing acid mine drainage according to claim 1 or any claim herein and further comprising the step of reducing iron concentrations in said acid mine drainage generation source.

58. A method of preventing acid mine drainage according to claim 1 or any claim herein wherein said surrounding environment comprises water.

59. An acid mine drainage treatment comprising:
    an acid mine drainage generation source identifier;
    a treatment location site having at least one acid mine drainage generation source;
    a plurality of acid mine drainage generation source materials in said at least one acid mine drainage generation source at said treatment location site; and
    at least one biofilm inducing substrate injection sample.

60. An acid mine drainage treatment according to claim 59 or any claim herein and further comprising at least one treatment area of said acid mine drainage generation source.

61. An acid mine drainage treatment according to claim 59 or any claim herein wherein said acid mine drainage generation source further comprises at least one kind of microbial population.

62. An acid mine drainage treatment according to claim 59 or any claim herein and further comprising a protective biofilm over said plurality of acid mine drainage generation source materials.

63. An acid mine drainage treatment according to claim 59 or any claim herein and further comprising at least a circumneutral pH in a surrounding environment of said acid mine drainage generation source.

64. An acid mine drainage treatment according to claim 62 or any claim herein wherein said protective biofilm comprises an oxidation prevention source.

65. An acid mine drainage treatment according to claim 62 or any claim herein wherein said protective biofilm comprises a sulfuric acid generation prevention source.

66. An acid mine drainage treatment according to claim 59 or any claim herein wherein said at least one biofilm inducing substrate injection sample comprises an up-gradient, down-hole injection sample.

67. An acid mine drainage treatment according to claim 59 or any claim herein wherein said at least one biofilm inducing substrate injection sample comprises a gravimetric injection sample.

68. An acid mine drainage treatment according to claim 59 or any claim herein wherein said at least one biofilm inducing substrate injection sample comprises a carbon source.

69. An acid mine drainage treatment according to claim 59 or any claim herein wherein said at least one biofilm inducing substrate injection sample comprises a dairy product.

70. An acid mine drainage treatment according to claim 59 or any claim herein wherein said at least one biofilm inducing substrate injection sample comprises returned milk.

71. An acid mine drainage treatment according to claim 69 or any claim herein wherein said dairy product is selected from a group consisting of: milk, returned milk, lactate, whey, ice cream, and combinations thereof.

72. An acid mine drainage treatment according to claim 68 or any claim herein wherein said carbon source comprises an amount of carbon selected from a group consisting of:
    a 2 to 1 ratio of organic carbon to water extractable sulfate concentration of waste material;
    a 3 to 1 ratio of organic carbon to water extractable sulfate concentration of waste material;
    a 4 to 1 ratio of organic carbon to water extractable sulfate concentration of waste material;
    a 5 to 1 ratio of organic carbon to water extractable sulfate concentration of waste material; and
    a 6 to 1 ratio of organic carbon to water extractable sulfate concentration of waste material.

73. An acid mine drainage treatment according to claim 68 or any claim herein wherein said carbon source comprises an amount of carbon selected from a group consisting of:
    a 2:1 ratio of moles of carbon consumed to moles of sulfate reduced;
    a 3:1 ratio of moles of carbon consumed to moles of sulfate reduced;

a 4:1 ratio of moles of carbon consumed to moles of sulfate reduced;
a 5:1 ratio of moles of carbon consumed to moles of sulfate reduced; and
a 6:1 ratio of moles of carbon consumed to moles of sulfate reduced.

74. An acid mine drainage treatment according to claim 59 or any claim herein wherein said at least one biofilm inducing substrate injection sample comprises a substrate selected from a group consisting of acetate, chitin, crustacean exoskeleton, corn syrup, vegetable oil, grease, kitchen grease, brewery wastes, carbohydrates, fats, proteins, industrial waste, and combinations thereof.

75. An acid mine drainage treatment according to claim 59 or any claim herein wherein said at least one biofilm inducing substrate injection sample comprises a liquid substrate.

76. An acid mine drainage treatment according to claim 75 or any claim herein wherein said at least one biofilm inducing substrate injection sample comprises a concentrated liquid substrate.

77. An acid mine drainage treatment according to claim 59 or any claim herein wherein said at least one biofilm inducing substrate injection sample comprises a solid substrate.

78. An acid mine drainage treatment according to claim 77 or any claim herein wherein said solid substrate is selected from a group consisting of dried and freeze-dried substrates.

79. An acid mine drainage treatment according to claim 59 or any claim herein wherein said at least one biofilm inducing substrate injection sample comprises a packaged product.

80. An acid mine drainage treatment according to claim 59 or any claim herein wherein said at least one biofilm inducing substrate injection sample comprises multiple biofilm inducing substrate injection samples.

81. An acid mine drainage treatment according to claim 61 or any claim herein wherein said at least one kind of microbial population comprises an indigenous population of said acid mine drainage generation source.

82. An acid mine drainage treatment according to claim 61 or any claim herein wherein said at least one kind of microbial population comprises at least one kind of newly injected microbial population.

83. An acid mine drainage treatment according to claim 82 or any claim herein wherein said at least one kind of newly injected microbial population comprises a single injection of said at least one newly injected microbial population.

84. An acid mine drainage treatment according to claim 61 or any claim herein wherein said at least one kind of microbial population is selected from a group consisting of metal-reducing bacteria, sulfate-reducing bacteria, methanogenic bacteria, facultative anaerobes, site specific species, bacteria found in said at least one substrate, and combinations thereof.

85. An acid mine drainage treatment according to claim 59 or any claim herein and further comprising at least one nutrient injection sample.

86. An acid mine drainage treatment according to claim 85 or any claim herein wherein said at least one nutrient injection sample comprises a nutrient selected from a group consisting of nitrogen, phosphorus, iron, and combinations thereof.

87. An acid mine drainage treatment according to claim 85 or any claim herein wherein said at least one nutrient injection sample comprises a nutrient selected from a group consisting of $Na_2HPO_4$, $NaH_2PO_4$, $NH_4Cl$, KCl, NTA (nitrilotriacetic acid), $MgSO_4$, $MnSO_4 \cdot H_2O$, NaCl, $FeSO_4 \cdot 7H_2O$, $CaCl_2 \cdot 2H_2O$, $CoCl_2 \cdot 6H_2O$, $ZnCl_2$, $CuSO_4 \cdot 5H_2O$, AlK$(SO_4)^2 \cdot 12H_2O$, $H_3BO_3$, $Na_2MoO_4$, $NiCl_2 \cdot 6H_2O$, $Na_2WO_4 \cdot 2H_2O$, potassium compounds, magnesium compounds, calcium compounds, sodium compounds, and combinations thereof.

88. An acid mine drainage treatment according to claim 85 or any claim herein wherein said at least one nutrient injection sample comprises trace amounts of metals.

89. An acid mine drainage treatment according to claim 59 or any claim herein and further comprising a pH adjuster injection sample.

90. An acid mine drainage treatment according to claim 89 or any claim herein wherein said pH adjuster injection sample comprises a pH adjuster selected from a group consisting of lime, trona, carbonate, bicarbonate, enzymes, proteins, and combinations thereof.

91. An acid mine drainage treatment according to claim 59 or any claim herein and further comprising a reductant injection sample.

92. An acid mine drainage treatment according to claim 91 or any claim herein wherein said reductant injection sample comprises a reductant selected from a group consisting of NaS, cystein, organic substrates, and combinations thereof.

93. An acid mine drainage treatment according to claim 59 or any claim herein wherein said treatment location site is selected from a group consisting of hard rock mine, backfilled coal mining waste, back filled mining waste, waste rock pile, copper mine, gold mine, lead mine, silver mine, and coal mine.

94. An acid mine drainage treatment according to claim 59 or any claim herein wherein said plurality of acid mine drainage generation source materials are selected from a group consisting of iron sulfides, iron disulfide ($FeS_2$), FeS, metal sulfides, sulfidic ore, crushed ore, tailings pile, waste rock, and combinations thereof.

95. An acid mine drainage treatment according to claim 62 or any claim herein wherein said protective biofilm comprises a complex protective biofilm.

96. An acid mine drainage treatment according to claim 95 or any claim herein wherein said complex protective biofilm comprises a diverse microbial community.

97. An acid mine drainage treatment according to claim 96 or any claim herein wherein said diverse microbial community comprises a number of different microbial species selected from a group consisting of greater than about 50 different species, greater than about 70 different species, about 75 different species, and greater than about 75 different species.

98. An acid mine drainage treatment according to claim 95 or any claim herein wherein said complex protective biofilm comprises a multilayered community.

99. An acid mine drainage treatment according to claim 98 or any claim herein wherein said multilayered community comprises layers selected from a group consisting of at least two layers, at least three layers, and at least four layers.

100. An acid mine drainage treatment according to claim 98 or any claim herein wherein said multilayered community comprises at least some facultative anaerobic bacteria in an outermost layer and at least some obligate anaerobic bacteria in an inner layer of said multilayered community.

101. An acid mine drainage treatment according to claim 96 or any claim herein wherein said diverse microbial community comprises bacteria selected from a group consisting of aerobic bacteria, anaerobic bacteria, facultative anaerobic bacteria, sulfate reducing bacteria, obligate anaerobic bacteria, cow teat bacteria, metal-tolerant denitrifier bacteria, sulfur-loving fermenter bacteria, *Desulfosporosinus* sp, sulfate reducing bacteria clone 159, *acidovorax avenae*, nickel tolerant denitrifier bacteria, facultative denitrifiers, uncultured bacterium clone B-42, and combinations thereof.

102. An acid mine drainage treatment according to claim 96 or any claim herein wherein said diverse microbial community comprises facultative anaerobic bacteria as a dominant species.

103. An acid mine drainage treatment according to claim 95 or any claim herein wherein said complex protective biofilm comprises microbial cells and extracellular polymers.

104. An acid mine drainage treatment according to claim 62 or any claim herein wherein said protective biofilm comprises a permanent biofilm.

105. An acid mine drainage treatment according to claim 59 or any claim herein wherein said acid mine drainage generation source identifier comprises an electromagnetic induction survey.

106. An acid mine drainage treatment according to claim 105 or any claim herein wherein said electromagnetic induction is selected from a group consisting of a ground electromagnetic induction survey and an air electromagnetic induction survey.

107. An acid mine drainage treatment according to claim 59 or any claim herein and further comprising at least one injection well.

108. An acid mine drainage treatment according to claim 63 or any claim herein wherein said at least said circumneutral pH in said surrounding environment comprises a pH level increased from an acidic pH to said at least said circumneutral pH in said surrounding environment.

109. An acid mine drainage treatment according to claim 63 or any claim herein wherein said circumneutral pH is selected from a group consisting of greater than about 6 pH, about 7 pH, greater than about 7 pH, about 7.2 pH, and between about 6 pH and about 8.5 pH.

110. An acid mine drainage treatment according to claim 109 or any claim herein said acidic pH is selected from a group consisting of less than about 6 pH, less than about 5 pH, about 4.5 pH, and about 2.5 pH.

111. An acid mine drainage treatment according to claim 62 or any claim herein wherein said protective biofilm prevents sulfuric acid generation for a period of time, said period of time is selected from a group consisting of at least about 3 months, more than about 1.8 years, more than about 2 years, about 6 months, about 9 months, about 12 months, about 18 months, more than about 19 months, about 24 months, about 3 years, about 5 years, and about 10 years.

112. An acid mine drainage treatment according to claim 62 or any claim herein wherein said protective biofilm comprises a hydrophobic physical barrier.

113. An acid mine drainage treatment according to claim 62 or any claim herein wherein said protective biofilm comprises an oxygen-reducing microbial barrier.

114. An acid mine drainage treatment according to claim 59 or any claim herein and further comprising a metal precipitate in said acid mine drainage generation source.

115. An acid mine drainage treatment according to claim 59 or any claim herein and further comprising a reduced iron concentration in said acid mine drainage generation source.

116. An acid mine drainage treatment according to claim 63 or any claim herein wherein said surrounding environment comprises water.

117. A method of treating contaminated water comprising the steps of:
providing a contaminated water environment having contaminants;
injecting returned milk into said contaminated water environment;
enhancing reductive degradation of said contaminated water environment with said returned milk;
supplying an electron source from said returned milk to at least one population of anaerobic bacteria in said contaminated water environment;
degrading said contaminants; and
providing a harmless end-product from said reductive degradation of said contaminants.

118. A method of treating contaminated water according to claim 117 or any claim herein wherein said contaminated water environment comprises an in-situ contaminated water environment.

119. A method of treating contaminated water according to claim 117 or any claim herein wherein said contaminated water environment comprises an ex-situ contaminated water environment.

120. A method of treating contaminated water according to claim 117 or any claim herein wherein said contaminants are selected from a group consisting of halogenated compounds, oxidized metals, chlorinated alkenes, chlorinated alkanes, chlorinated aromatics, fluorinated alkenes, fluorinated alkanes, brominated alkenes, brominated alkanes, brominated aromatics, perchloroethene, trichloroethene, perchlorate, dichloroethylene, vinyl chloride, carbon tetrachloride, chlorobenzene, uranium, chromium, arsenate, and combinations thereof.

121. A method of treating contaminated water according to claim 117 or any claim herein wherein said step of injecting said returned milk into said contaminated water environment comprises the step of injecting liquid returned milk into said contaminated water environment.

122. A method of treating contaminated water according to claim 117 or any claim herein wherein said step of injecting said returned milk into said contaminated water environment comprises the step of injecting concentrated liquid returned milk into said contaminated water environment.

123. A method of treating contaminated water according to claim 117 or any claim herein wherein said returned milk comprises solid returned milk.

124. A method of treating contaminated water according to claim 123 or any claim herein wherein said solid returned milk comprises a dried product.

125. A method of treating contaminated water according to claim 123 or any claim herein wherein said solid returned milk comprises a freeze-dried product.

126. A method of treating contaminated water according to claim 117 or any claim herein wherein said step of injecting said returned milk into said contaminated water environment comprises the step of injecting a packaged product into said contaminated water environment.

127. A method of treating contaminated water according to claim 117 or any claim herein and further comprising the step of injecting at least one additive into said contaminated water environment.

128. A method of treating contaminated water according to claim 127 or any claim herein wherein said at least one additive is selected from a group consisting of organic substrates, nutrients, micro-metals, bacterial inoculum, pH adjuster, reductant, sulfate, ferrous iron, ferrous sulfate, and combinations thereof.

129. A method of treating contaminated water according to claim 128 or any claim herein wherein said organic substrates are selected from a group consisting of whey, ice cream, lactate, acetate, chitin, crustacean exoskeleton, corn syrup, vegetable oil, grease, kitchen grease, brewery wastes, carbohydrates, fats, proteins, industrial waste, and combinations thereof.

130. A method of treating contaminated water according to claim 128 or any claim herein wherein said nutrients are selected from a group consisting of nitrogen, phosphorous, ammonium phosphate, iron, and combinations thereof.

131. A method of treating contaminated water according to claim 128 or any claim herein wherein said bacterial inoculum is selected from a group consisting of metal-reducing bacteria, sulfate-reducing bacteria, methanogenic bacteria, facultative bacteria, site specified species, fermentative bacteria, dehalogenating bacteria, and combinations thereof.

132. A method of treating contaminated water according to claim 128 or any claim herein wherein said pH adjuster is selected from a group consisting of lime, trona, carbonate, bicarbonate, enzymes, proteins, and combinations thereof 133. A method of treating contaminated water according to claim 128 or any claim herein wherein said reductant is selected from a group consisting of NaS, cystein, organic substrates, and combinations thereof.

134. A method of treating contaminated water according to claim 117 or any claim herein wherein said contaminants comprises oxidized metals, and wherein said harmless end-product comprises an immobilized precipitate.

As can be easily understood from the foregoing, the basic concepts of the present invention may be embodied in a variety of ways. It involves both contamination treatment techniques as well as devices to accomplish the appropriate treatment. In this application, the contamination treatment techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "treatment" should be understood to encompass disclosure of the act of "treating"—whether explicitly discussed or not—and, conversely, were there effectively disclosure of the act of "treating", such a disclosure should be understood to encompass disclosure of a "treatment" and even a "means for treating." Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed below or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

I. U.S. PATENT DOCUMENTS

| DOCUMENT NO. & KIND CODE (if known) | PUB'N DATE mm-dd-yyyy | PATENTEE OR APPLICANT NAME |
|---|---|---|
| 3,388,058 | Jun. 11, 1968 | Wirth |
| 3,516,931 | Jun. 23, 1970 | Birch |
| 3,823,081 | Jul. 09, 1974 | Treharne et al. |
| 4,695,378 | Sep. 22, 1987 | Ackman et al. |
| 4,869,905 | Sep. 26, 1989 | Sobek et al. |
| 4,886,432 | Dec. 12, 1989 | Kimberlin |
| 5,171,454 | Dec. 15, 1992 | Bockowski et al. |
| 5,200,033 | Apr. 06, 1993 | Weitzman |
| 5,439,594 | Aug. 08, 1995 | Regan et al. |
| 5,550,141 | Aug. 27, 1996 | Gould et al. |
| 5,554,290 | Sep. 10, 1996 | Suthersan |
| 5,575,589 | Nov. 19, 1996 | Suthersan |
| 5,588,490 | Dec. 31, 1996 | Suthersan |
| 5,616,251 | Apr. 01, 1997 | Batarseh |
| 5,698,107 | Dec. 16, 1997 | Wurzburger et al. |
| 6,007,274 | Dec. 28, 2000 | Suthersan |
| 6,102,623 | Aug. 15, 2000 | Suthersan |
| 6,116,816 | Sep. 12, 2000 | Suthersan |
| 6,143,177 | Nov. 07, 2000 | Suthersan |
| 6,165,251 | Dec. 26, 2000 | Lemieux, et al. |
| 6,174,108 | Jan. 16, 2001 | Suthersan |
| 6,254,310 | Jul. 03, 2001 | Suthersan |
| 6,280,118 | Aug. 28, 2001 | Suthersan |
| 6,283,674 | Sep. 14, 2001 | Suthersan |
| 6,322,700 | Nov. 27, 2001 | Suthersan |
| 6,398,960 | Jun. 04, 2002 | Borden |
| 6,481,929 | Nov. 19, 2002 | Layton |
| 6,555,001 | Apr. 29, 2003 | Crossman |
| 6,616,845 | Sep. 09, 2003 | Shechter et al. |
| 6,632,364 | Oct. 14, 2003 | Suthersan |
| 6,777,449 | Aug. 17, 2004 | Vance et al. |
| 6,783,678 | Aug. 31, 2004 | Sorenson |
| 6,790,352 | Sep. 14, 2004 | Wurzburger et al. |
| 6,797,171 | Sep. 28, 2004 | Bartlett |
| 6,916,136 | Jun. 12, 2003 | Layton et al. |
| 6,932,909 | Aug. 23, 2005 | Rey |
| 6,962,662 | Nov. 08, 2005 | Wurzburger |
| 7,033,507 | Apr. 25, 2006 | Zhuang |
| 7,077,963 | Jul. 18, 2006 | McConchie et al. |
| 7,115,201 | Oct. 03, 2006 | Rey |
| 7,140,495 | Nov. 28, 2006 | Hester et al. |
| 7,141,170 | Nov. 28, 2006 | Sorenson, Jr. |
| 7,338,597 | Mar. 04, 2008 | Rittmann et al. |
| 20,020,151,602 | Oct. 17, 2002 | Vance et al. |
| 20,030,108,394 | Jun. 12, 2003 | Layton et al. |
| 20,040,245,187 | Dec. 09, 2004 | Vance et al. |
| 20,050,036,930 | Feb. 17, 2005 | Elsetinow et al. |
| 20,060,024,659 | Feb. 02, 2006 | Becker et al. |
| 20,070,045,542 | Mar. 01, 2007 | Hashmonay |
| 20,070,163,954 | Jul. 19, 2007 | Badreddine |

II. FOREIGN PATENT DOCUMENTS

| Foreign Patent Document Country Code, Number, Kind Code (if known) | PUB'N DATE mm-dd-yyyy | PATENTEE OR APPLICANT NAME |
|---|---|---|
| WO 2007/098475 A3 | Aug. 30, 2007 | Cooley et al. |
| WO 2007/027406 A1 | Mar. 08, 2007 | General Electric Company |
| WO 97/02333 | Jan. 23, 1997 | La Trobe University |
| WO 02/06540 A2 | Jan. 24, 2002 | Wisconsin Alumni Research Foundation |

III. NON-PATENT LITERATURE DOCUMENTS

JRW Bioremediation LLC, BIOREMEDIATION PRODUCTS; jrwbioremediation.com; Jun. 25, 2007; 2 pages JRW Bioremediation LLC, BIOREMEDIATION PRODUCTS LEADER; Cost Effective Bioremediation Amendments; jrwbioremediation.com; Jun. 25, 2007; 3 pages Technology Development - The EOS ® Process (U.S. Pat. No. 6,398,960/International Patents pending); Innovation Dechlorination; solutions-ies.com; Jun. 25, 2007; 2 pages ARCADIS, Remediation; www.arcadis-us.com; Jun. 25, 2007; 1 page ARCADIS, Focused_on our market trends; www.arcadis-us.com; Jun. 25, 2007, 1 page Johnson, D. B, et al. Acid mine drainage remediationoptions: a review; Science of the Total Environment 338 (2005) 3-14

Jin, S., et al. Source treatment of acid mine drainage at a backfilled coal mine using remote sensing and biogeochemistry, Water Air Soil Pollut (2008) 188:205-212; published online: 7 Nov. 2007.

Jin, S., et al. Biological source treatment of acid mine drainage using microbial and substrate amendments: Microcosm studies; Mine Water Environ (2008) 27:20-30; published online 24 Nov. 2007.

Ueshima M., et al. Development of iron-phosphate biofilms on pyretic ine waste rock surfaces previously treated with natural phosphate rocks; Geomicrobiology Journal, 21:313-323, 2004

Zhang, X. V., et al. Physical structures of lipid layers on pyrite; Environ. Sci. Technol. 2006, 40, 1511-1515

Zhang, X. V., et al. Pyrite oxidation inhibition by a cross-linked lipid coating; Geochem. Trans., 2003, 4(2), 8-11

Thus, the applicant(s) should be understood to have support to claim and make a statement of invention to at least: i) each of the treatment devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

The use of the phrase, "or any other claim" is used to provide support for any claim to be dependent on any other claim, such as another dependent claim, another independent claim, a previously listed claim, a subsequently listed claim, and the like. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method of preventing acid mine drainage comprising the steps of:
   identifying an acid mine drainage generation source at a treatment location site;
   locating at least one treatment area in said acid mine drainage generation source;
   injecting at least one substrate into said at least one treatment area of said acid mine drainage generation source;
   biologically consuming at least some of said at least one substrate by at least one kind of microbial population;
   biologically constructing a protective biofilm over a plurality of acid mine drainage generation source materials;
   preventing oxidation of said acid mine drainage generation source materials with said biofilm;
   preventing sulfuric acid generation in said acid mine drainage generation source; and
   attaining at least a circumneutral pH in a surrounding environment of said acid mine drainage generation source.

2. A method of preventing acid mine drainage according to claim 1 wherein said step of injecting said at least one substrate into said at least one treatment area of said acid mine drainage generation source comprises the step of up-gradient, down-hole injecting said at least one substrate into said at least one treatment area of said acid mine drainage generation source.

3. A method of preventing acid mine drainage according to claim 1 wherein said step of injecting at least one substrate into said at least one treatment area of said acid mine drainage generation source comprises the step of gravimetrically injecting said at least one substrate into said at least one treatment area of said acid mine drainage generation source.

4. A method of preventing acid mine drainage according to claim 1 wherein said step of injecting said at least one substrate into said at least one treatment area of said acid mine drainage generation source comprises the step of injecting at least one carbon source into said at least one treatment area of said acid mine drainage generation source.

5. A method of preventing acid mine drainage according to claim 1 wherein said at least one substrate comprises a dairy product.

6. A method of preventing acid mine drainage according to claim 1 wherein said at least one substrate comprises returned milk.

7. A method of preventing acid mine drainage according to claim 1 wherein said at least one substrate is selected from a group consisting of acetate, chitin, crustacean exoskeleton, corn syrup, vegetable oil, grease, kitchen grease, brewery wastes, carbohydrates, fats, proteins, industrial waste, and combinations thereof.

8. A method of preventing acid mine drainage according to claim 1 wherein said step of injecting said at least one substrate into said at least one treatment area of said acid mine drainage generation source comprises the step of injecting a liquid substrate into said at least one treatment area of said acid mine drainage generation source.

9. A method of preventing acid mine drainage according to claim 8 wherein said liquid substrate comprises a concentrated liquid substrate.

10. A method of preventing acid mine drainage according to claim 1 wherein said step of injecting said at least one substrate into said at least one treatment area of said acid mine drainage generation source comprises the step of injecting a solid substrate into said at least one treatment area of said acid mine drainage generation source.

11. A method of preventing acid mine drainage according to claim 10 wherein said solid substrate is selected from a group consisting of dried and freeze-dried substrates.

12. A method of preventing acid mine drainage according to claim 1 wherein said step of injecting said at least one substrate into said at least one treatment area of said acid mine drainage generation source comprises the step of injecting a packaged product into said at least one treatment area of said acid mine drainage generation source.

13. A method of preventing acid mine drainage according to claim 1 wherein said step of injecting said at least one substrate into said at least one treatment area of said acid mine drainage generation source comprises the step of injecting multiple substrate doses in said at least one treatment area of said acid mine drainage generation source.

14. A method of preventing acid mine drainage according to claim 1 wherein said at least one kind of microbial population comprises at least one kind of indigenous microbial population located in said acid mine drainage generation source.

15. A method of preventing acid mine drainage according to claim 1 and further comprising the step of injecting a microbial inoculum into said at least one treatment area of said acid mine drainage generation source.

16. A method of preventing acid mine drainage according to claim 15 wherein said microbial inoculum comprises at least one new kind of microbial population.

17. A method of preventing acid mine drainage according to claim 1 wherein said at least one kind of microbial population is selected from a group consisting of metal-reducing bacteria, sulfate-reducing bacteria, methanogenic bacteria, facultative anaerobes, site specific species, bacteria found in said at least one substrate, and combinations thereof.

18. A method of preventing acid mine drainage according to claim 16 wherein said microbial population is selected from a group consisting of metal-reducing bacteria, sulfate-reducing bacteria, methanogenic bacteria, facultative anaerobes, site specific species, bacteria found in said at least one substrate, and combinations thereof.

19. A method of preventing acid mine drainage according to claim 1 and further comprising the step of injecting at least one nutrient into said at least one treatment area of said acid mine drainage generation source.

20. A method of preventing acid mine drainage according to claim 19 wherein said at least one nutrient is selected from a group consisting of nitrogen, phosphorus, iron, and combinations thereof.

21. A method of preventing acid mine drainage according to claim 19 wherein said at least one nutrient is selected from a group consisting of $Na_2HPO_4$, $NaH_2PO_4$, $NH_4Cl$, KCl, NTA (nitrilotriacetic acid), $MgSO_4$, $MnSO_4 \cdot H_2O$, NaCl, $FeSO_4 \cdot 7H_2O$, $CaCl_2 \cdot 2H_2O$, $CoCl_2 \cdot 6H_2O$, $ZnCl_2$, $CuSO_4 \cdot 5H_2O$, $AlK(SO_4)_2 \cdot 12H_2O$, $H_3BO_3$, $Na_2MoO_4$, $NiCl_2 \cdot 6H_2O$, $Na_2WO_4 \cdot 2H_2O$, potassium compounds, magnesium compounds, calcium compounds, sodium compounds, and combinations thereof.

22. A method of preventing acid mine drainage according to claim 19 wherein said at least one nutrient comprises trace amounts of metals.

23. A method of preventing acid mine drainage according to claim 1 wherein said treatment location site is selected from a group consisting of hard rock mine, backfilled coal mining waste, backfilled mining waste, waste rock pile, copper mine, gold mine, lead mine, silver mine, and coal mine.

24. A method of preventing acid mine drainage according to claim 1 wherein said acid mine drainage generation source materials are selected from a group consisting of iron sulfides, iron disulfide ($FeS_2$), FeS, metal sulfides, sulfidic ore, crushed ore, tailings pile, waste rock, and combinations thereof.

25. A method of preventing acid mine drainage according to claim 1 wherein said step of biologically constructing said protective biofilm over said plurality of said acid mine drainage generation source materials comprises the step of biologically constructing a complex protective biofilm over said plurality of said acid mine drainage generation source materials.

26. A method of preventing acid mine drainage according to claim 25 wherein said complex protective biofilm comprises a diverse microbial community.

27. A method of preventing acid mine drainage according to claim 26 wherein said diverse microbial community comprises a number of different microbial species selected from a group consisting of greater than about 50 different species, greater than about 70 different species, about 75 different species, and greater than about 75 different species.

28. A method of preventing acid mine drainage according to claim 25 wherein said complex protective biofilm comprises a multilayered community.

29. A method of preventing acid mine drainage according to claim 28 wherein said multilayered community comprises layers selected from a group consisting of at least two layers, at least three layers, and at least four layers.

30. A method of preventing acid mine drainage according to claim 28 wherein said multilayered community comprises at least some facultative anaerobic bacteria in an outermost layer and at least some obligate anaerobic bacteria in an inner layer of said multilayered community.

31. A method of preventing acid mine drainage according to claim 26 wherein said diverse microbial community comprises bacteria selected from a group consisting of aerobic bacteria, anaerobic bacteria, facultative anaerobic bacteria, sulfate reducing bacteria, obligate anaerobic bacteria, cow teat bacteria, metal-tolerant denitrifier bacteria, sulfur-loving fermenter bacteria, *Desulfosporosinus* sp, sulfate reducing bacteria clone 159, *acidovorax avenae*, nickel tolerant denitrifier bacteria, facultative denitrifiers, uncultured bacterium clone B-42, and combinations thereof.

32. A method of preventing acid mine drainage according to claim 26 wherein said diverse microbial community comprises facultative anaerobic bacteria as a dominant species.

33. A method of preventing acid mine drainage according to claim 25 wherein said complex protective biofilm comprises microbial cells and extracellular polymers.

34. A method of preventing acid mine drainage according to claim 1 wherein said step of biologically constructing a protective biofilm over said plurality of acid mine drainage generation source materials comprise the step of biologically constructing a permanent protective biofilm over said plurality of acid mine drainage generation source materials.

35. A method of preventing acid mine drainage according to claim 1 wherein said step of identifying said acid mine drainage generation source at said treatment location site comprises the step of utilizing an electromagnetic induction survey.

36. A method of preventing acid mine drainage according to claim 1 wherein said step of attaining at least said circumneutral pH in said surrounding environment of said acid mine drainage generation source comprises the step of increasing a pH level in said surrounding environment of said acid mine drainage generation source.

37. A method of preventing acid mine drainage according to claim 36 wherein said step of increasing said pH level in said surrounding environment of said acid mine drainage generation source comprises the step of increasing said pH level from an acidic pH to a circumneutral pH.

38. A method of preventing acid mine drainage according to claim 1 wherein said circumneutral pH is selected from a group consisting of greater than about 6 pH, about 7 pH, greater than about 7 pH, about 7.2 pH, and between about 6 pH and about 8.5 pH.

39. A method of preventing acid mine drainage according to claim 37 wherein said acidic pH is selected from a group consisting of less than about 6 pH, less than about 5 pH, about 4.5 pH, and about 2.5 pH.

40. A method of preventing acid mine drainage according to claim 1 wherein said step of preventing sulfuric acid generation in said acid mine drainage generation source comprises preventing sulfuric acid generation for a period of time, said period of time is selected from a group consisting of at least about 3 months, more than about 1.8 years, more than about 2 years, about 6 months, about 9 months, about 12 months, about 18 months, more than about 19 months, about 24 months, about 3 years, about 5 years, and about 10 years.

41. A method of preventing acid mine drainage according to claim 1 wherein said step of preventing oxidation in said acid mine drainage generation source materials comprises the step of physically preventing oxidation in said acid mine drainage generation source materials.

42. A method of preventing acid mine drainage according to claim 41 wherein said step of physically preventing oxidation in said acid mine drainage generation source materials comprises the step of providing a hydrophobic physical barrier in said biofilm.

43. A method of preventing acid mine drainage according to claim 1 wherein said step of preventing oxidation in said acid mine drainage generation source materials comprises the step of chemically preventing oxidation in said acid mine drainage generation source materials.

44. A method of preventing acid mine drainage according to claim 43 wherein said step of chemically preventing oxidation in said acid mine drainage generation source materials comprises the step of providing an oxygen-reducing microbial barrier in said biofilm.

45. A method of preventing acid mine drainage according to claim 5 wherein said dairy product is selected from a group consisting of milk, returned milk, lactate, whey, ice cream, and combinations thereof.

46. A method of preventing acid mine drainage according to claim 4 wherein said step of injecting said at least one carbon source into said at least one treatment area of said acid mine drainage generation source comprises the step of injecting an amount of said carbon source, said amount selected from a group consisting of:
 a 2 to 1 ratio of organic carbon to water extractable sulfate concentration of waste material;
 a 3 to 1 ratio of organic carbon to water extractable sulfate concentration of waste material;
 a 4 to 1 ratio of organic carbon to water extractable sulfate concentration of waste material;
 a 5 to 1 ratio of organic carbon to water extractable sulfate concentration of waste material; and
 a 6 to 1 ratio of organic carbon to water extractable sulfate concentration of waste material.

47. A method of preventing acid mine drainage according to claim 4 wherein said step of injecting said at least one carbon source into said at least one treatment area of said acid mine drainage generation source comprises the step of injecting an amount of said carbon source, said amount selected from a group consisting of:
 a 2:1 ratio of moles of carbon consumed to moles of sulfate reduced;
 a 3:1 ratio of moles of carbon consumed to moles of sulfate reduced;
 a 4:1 ratio of moles of carbon consumed to moles of sulfate reduced;
 a 5:1 ratio of moles of carbon consumed to moles of sulfate reduced; and
 a 6:1 ratio of moles of carbon consumed to moles of sulfate reduced.

48. A method of preventing acid mine drainage according to claim 1 and further comprising the step of injecting a pH adjuster into said at least one treatment area of said acid mine drainage generation source.

49. A method of preventing acid mine drainage according to claim 48 wherein said pH adjuster is selected from a group consisting of lime, trona, carbonate, bicarbonate, enzymes, proteins, and combinations thereof.

50. A method of preventing acid mine drainage according to claim 1 and further comprising the step of injecting a reductant into said at least one treatment area of said acid mine drainage generation source.

51. A method of preventing acid mine drainage according to claim 50 wherein said reductant is selected from a group consisting of NaS, cystein, organic substrates, and combinations thereof.

52. A method of preventing acid mine drainage according to claim 35 wherein said electromagnetic induction survey is selected from a group consisting of a ground electromagnetic induction survey and an air electromagnetic induction survey.

53. A method of preventing acid mine drainage according to claim 35 and further comprising the step of monitoring said acid mine drainage generation source using said electromagnetic induction survey.

54. A method of preventing acid mine drainage according to claim 1 wherein said step of locating said at least one treatment area in said acid mine drainage generation source comprises the step of installing at least one injection well in said at least one treatment area of said acid mine drainage generation source.

55. A method of preventing acid mine drainage according to claim 1 and further comprising the step of precipitating metals in said acid mine drainage generation source.

56. A method of preventing acid mine drainage according to claim 1 and further comprising the step of neutralizing sulfuric acid in said acid mine drainage generation source.

57. A method of preventing acid mine drainage according to claim 1 and further comprising the step of reducing iron concentrations in said acid mine drainage generation source.

58. A method of preventing acid mine drainage according to claim 1 wherein said surrounding environment comprises water.

59. A method of treating contaminated water comprising the steps of:
providing a contaminated water environment having contaminants;
injecting a returned milk packaged product into said contaminated water environment;
enhancing reductive degradation of said contaminated water environment with said returned milk;
supplying an electron source from said returned milk to at least one population of anaerobic bacteria in said contaminated water environment;
degrading said contaminants; and
providing a harmless end-product from said reductive degradation of said contaminants.

60. A method of treating contaminated water according to claim 59 wherein said contaminated water environment comprises an in-situ contaminated water environment.

61. A method of treating contaminated water according to claim 59 wherein said contaminated water environment comprises an ex-situ contaminated water environment.

62. A method of treating contaminated water according to claim 59 wherein said contaminants are selected from a group consisting of halogenated compounds, oxidized metals, chlorinated alkenes, chlorinated alkanes, chlorinated aromatics, fluorinated alkenes, fluorinated alkanes, brominated alkenes, brominated alkanes, brominated aromatics, perchloroethene, trichloroethene, perchlorate, dichloroethylene, vinyl chloride, carbon tetrachloride, chlorobenzene, uranium, chromium, arsenate, and combinations thereof.

63. A method of treating contaminated water according to claim 59 wherein said step of injecting said returned milk into said contaminated water environment comprises the step of injecting liquid returned milk into said contaminated water environment.

64. A method of treating contaminated water according to claim 59 wherein said step of injecting said returned milk into said contaminated water environment comprises the step of injecting concentrated liquid returned milk into said contaminated water environment.

65. A method of treating contaminated water according to claim 59 wherein said returned milk comprises solid returned milk.

66. A method of treating contaminated water according to claim 65 wherein said solid returned milk comprises a dried product.

67. A method of treating contaminated water according to claim 65 wherein said solid returned milk comprises a freeze-dried product.

68. A method of treating contaminated water according to claim 59 and further comprising the step of injecting at least one additive into said contaminated water environment.

69. A method of treating contaminated water according to claim 68 wherein said at least one additive is selected from a group consisting of organic substrates, nutrients, micro-metals, bacterial inoculum, pH adjuster, reductant, sulfate, ferrous iron, ferrous sulfate, and combinations thereof.

70. A method of treating contaminated water according to claim 69 wherein said organic substrates are selected from a group consisting of whey, ice cream, lactate, acetate, chitin, crustacean exoskeleton, corn syrup, vegetable oil, grease, kitchen grease, brewery wastes, carbohydrates, fats, proteins, industrial waste, and combinations thereof.

71. A method of treating contaminated water according to claim 69 wherein said nutrients are selected from a group consisting of nitrogen, phosphorous, ammonium phosphate, iron, and combinations thereof.

72. A method of treating contaminated water according to claim 69 wherein said bacterial inoculum is selected from a group consisting of metal-reducing bacteria, sulfate-reducing bacteria, methanogenic bacteria, facultative bacteria, site specified species, fermentative bacteria, dehalogenating bacteria, and combinations thereof.

73. A method of treating contaminated water according to claim 69 wherein said pH adjuster is selected from a group consisting of lime, trona, carbonate, bicarbonate, enzymes, proteins, and combinations thereof.

74. A method of treating contaminated water according to claim 69 wherein said reductant is selected from a group consisting of NaS, cystein, organic substrates, and combinations thereof.

75. A method of treating contaminated water according to claim 59 wherein said contaminants comprises oxidized metals, and wherein said harmless end-product comprises an immobilized precipitate.

76. An acid mine drainage treatment system comprising:
an acid mine drainage generation source identifier;
a treatment location site having at least one acid mine drainage generation source;
a plurality of acid mine drainage generation source materials in said at least one acid mine drainage generation source at said treatment location site; and
at least one biofilm inducing substrate injection sample.

77. An acid mine drainage treatment system according to claim 76 and further comprising at least one treatment area of said acid mine drainage generation source.

78. An acid mine drainage treatment system according to claim 76 wherein said acid mine drainage generation source further comprises at least one kind of microbial population.

79. An acid mine drainage treatment system according to claim 76 and further comprising a protective biofilm over said plurality of acid mine drainage generation source materials.

80. An acid mine drainage treatment system according to claim 76 and further comprising at least a circumneutral pH in a surrounding environment of said acid mine drainage generation source.

81. An acid mine drainage treatment system according to claim 79 wherein said protective biofilm comprises an oxidation prevention source.

82. An acid mine drainage treatment system according to claim 79 wherein said protective biofilm comprises a sulfuric acid generation prevention source.

83. An acid mine drainage treatment system according to claim 76 wherein said at least one biofilm inducing substrate injection sample comprises an up-gradient, down-hole injection sample.

84. An acid mine drainage treatment system according to claim 76 wherein said at least one biofilm inducing substrate injection sample comprises a gravimetric injection sample.

85. An acid mine drainage treatment system according to claim 76 wherein said at least one biofilm inducing substrate injection sample comprises a carbon source.

86. An acid mine drainage treatment system according to claim 76 wherein said at least one biofilm inducing substrate injection sample comprises a dairy product.

87. An acid mine drainage treatment system according to claim 76 wherein said at least one biofilm inducing substrate injection sample comprises returned milk.

88. An acid mine drainage treatment system according to claim 86 wherein said dairy product is selected from a group consisting of milk, returned milk, lactate, whey, ice cream, and combinations thereof.

89. An acid mine drainage treatment system according to claim 85 wherein said carbon source comprises an amount of carbon selected from a group consisting of:
 a 2 to 1 ratio of organic carbon to water extractable sulfate concentration of waste material;
 a 3 to 1 ratio of organic carbon to water extractable sulfate concentration of waste material;
 a 4 to 1 ratio of organic carbon to water extractable sulfate concentration of waste material;
 a 5 to 1 ratio of organic carbon to water extractable sulfate concentration of waste material; and
 a 6 to 1 ratio of organic carbon to water extractable sulfate concentration of waste material.

90. An acid mine drainage treatment system according to claim 85 wherein said carbon source comprises an amount of carbon selected from a group consisting of:
 a 2:1 ratio of moles of carbon consumed to moles of sulfate reduced;
 a 3:1 ratio of moles of carbon consumed to moles of sulfate reduced;
 a 4:1 ratio of moles of carbon consumed to moles of sulfate reduced;
 a 5:1 ratio of moles of carbon consumed to moles of sulfate reduced; and
 a 6:1 ratio of moles of carbon consumed to moles of sulfate reduced.

91. An acid mine drainage treatment system according to claim 76 wherein said at least one biofilm inducing substrate injection sample comprises a substrate selected from a group consisting of acetate, chitin, crustacean exoskeleton, corn syrup, vegetable oil, grease, kitchen grease, brewery wastes, carbohydrates, fats, proteins, industrial waste, and combinations thereof.

92. An acid mine drainage treatment system according to claim 76 wherein said at least one biofilm inducing substrate injection sample comprises a liquid substrate.

93. An acid mine drainage treatment system according to claim 92 wherein said at least one biofilm inducing substrate injection sample comprises a concentrated liquid substrate.

94. An acid mine drainage treatment system according to claim 76 wherein said at least one biofilm inducing substrate injection sample comprises a solid substrate.

95. An acid mine drainage treatment system according to claim 94 wherein said solid substrate is selected from a group consisting of dried and freeze-dried substrates.

96. An acid mine drainage treatment system according to claim 76 wherein said at least one biofilm inducing substrate injection sample comprises a packaged product.

97. An acid mine drainage treatment system according to claim 76 wherein said at least one biofilm inducing substrate injection sample comprises multiple biofilm inducing substrate injection samples.

98. An acid mine drainage treatment system according to claim 78 wherein said at least one kind of microbial population comprises an indigenous population of said acid mine drainage generation source.

99. An acid mine drainage treatment system according to claim 78 wherein said at least one kind of microbial population comprises at least one kind of newly injected microbial population.

100. An acid mine drainage treatment system according to claim 99 wherein said at least one kind of newly injected microbial population comprises a single injection of said at least one newly injected microbial population.

101. An acid mine drainage treatment system according to claim 78 wherein said at least one kind of microbial population is selected from a group consisting of metal-reducing bacteria, sulfate-reducing bacteria, methanogenic bacteria, facultative anaerobes, site specific species, bacteria found in said at least one substrate, and combinations thereof.

102. An acid mine drainage treatment system according to claim 76 and further comprising at least one nutrient injection sample.

103. An acid mine drainage treatment system according to claim 102 wherein said at least one nutrient injection sample comprises a nutrient selected from a group consisting of nitrogen, phosphorus, iron, and combinations thereof.

104. An acid mine drainage treatment system according to claim 102 wherein said at least one nutrient injection sample comprises a nutrient selected from a group consisting of $Na_2HPO_4$, $NaH_2PO_4$, $NH_4Cl$, $KCl$, NTA (nitrilotriacetic acid), $MgSO_4$, $MnSO_4 \cdot H_2O$, $NaCl$, $FeSO_4 \cdot 7H_2O$, $CaCl_2 \cdot 2H_2O$, $CoCl_2 \cdot 6H_2O$, $ZnCl_2$, $CuSO_4 \cdot 5H_2O$, $AlK(SO_4)_2 \cdot 12H_2O$, $H_3BO_3$, $Na_2MoO_4$, $NiCl_2 \cdot 6H_2O$, $Na_2WO_4 \cdot 2H_2O$, potassium compounds, magnesium compounds, calcium compounds, sodium compounds, and combinations thereof.

105. An acid mine drainage treatment system according to claim 102 wherein said at least one nutrient injection sample comprises trace amounts of metals.

106. An acid mine drainage treatment system according to claim 76 and further comprising a pH adjuster injection sample.

107. An acid mine drainage treatment system according to claim 106 wherein said pH adjuster injection sample comprises a pH adjuster selected from a group consisting of lime, trona, carbonate, bicarbonate, enzymes, proteins, and combinations thereof.

108. An acid mine drainage treatment system according to claim 76 and further comprising a reductant injection sample.

109. An acid mine drainage treatment system according to claim 108 wherein said reductant injection sample comprises a reductant selected from a group consisting of NaS, cystein, organic substrates, and combinations thereof.

110. An acid mine drainage treatment system according to claim 76 wherein said treatment location site is selected from a group consisting of hard rock mine, backfilled coal mining waste, backfilled mining waste, waste rock pile, copper mine, gold mine, lead mine, silver mine, and coal mine.

111. An acid mine drainage treatment system according to claim 76 wherein said plurality of acid mine drainage generation source materials are selected from a group consisting of iron sulfides, iron disulfide ($FeS_2$), FeS, metal sulfides, sulfidic ore, crushed ore, tailings pile, waste rock, and combinations thereof.

112. An acid mine drainage treatment system according to claim 79 wherein said protective biofilm comprises a complex protective biofilm.

113. An acid mine drainage treatment system according to claim 112 wherein said complex protective biofilm comprises a diverse microbial community.

114. An acid mine drainage treatment system according to claim 113 wherein said diverse microbial community comprises a number of different microbial species selected from a group consisting of greater than about 50 different species, greater than about 70 different species, about 75 different species, and greater than about 75 different species.

115. An acid mine drainage treatment system according to claim 112 wherein said complex protective biofilm comprises a multilayered community.

116. An acid mine drainage treatment system according to claim 115 wherein said multilayered community comprises layers selected from a group consisting of at least two layers, at least three layers, and at least four layers.

117. An acid mine drainage treatment system according to claim 115 wherein said multilayered community comprises at least some facultative anaerobic bacteria in an outermost layer and at least some obligate anaerobic bacteria in an inner layer of said multilayered community.

118. An acid mine drainage treatment system according to claim 113 wherein said diverse microbial community comprises bacteria selected from a group consisting of aerobic bacteria, anaerobic bacteria, facultative anaerobic bacteria, sulfate reducing bacteria, obligate anaerobic bacteria, cow teat bacteria, metal-tolerant denitrifier bacteria, sulfur-loving fermenter bacteria, *Desulfosporosinus* sp, sulfate reducing bacteria clone 159, *acidovorax avenae*, nickel tolerant denitrifier bacteria, facultative denitrifiers, uncultured bacterium clone B-42, and combinations thereof.

119. An acid mine drainage treatment system according to claim 113 wherein said diverse microbial community comprises facultative anaerobic bacteria as a dominant species.

120. An acid mine drainage treatment system according to claim 112 wherein said complex protective biofilm comprises microbial cells and extracellular polymers.

121. An acid mine drainage treatment system according to claim 79 wherein said protective biofilm comprises a permanent biofilm.

122. An acid mine drainage treatment system according to claim 76 wherein said acid mine drainage generation source identifier comprises an electromagnetic induction survey.

123. An acid mine drainage treatment system according to claim 122 wherein said electromagnetic induction is selected from a group consisting of a ground electromagnetic induction survey and an air electromagnetic induction survey.

124. An acid mine drainage treatment system according to claim 76 and further comprising at least one injection well.

125. An acid mine drainage treatment system according to claim 80 wherein said at least said circumneutral pH in said surrounding environment comprises a pH level increased from an acidic pH to said at least said circumneutral pH in said surrounding environment.

126. An acid mine drainage treatment system according to claim 80 wherein said circumneutral pH is selected from a group consisting of greater than about 6 pH, about 7 pH, greater than about 7 pH, about 7.2 pH, and between about 6 pH and about 8.5 pH.

127. An acid mine drainage treatment system according to claim 126 said acidic pH is selected from a group consisting of less than about 6 pH, less than about 5 pH, about 4.5 pH, and about 2.5 pH.

128. An acid mine drainage treatment system according to claim 79 wherein said protective biofilm prevents sulfuric acid generation for a period of time, said period of time is selected from a group consisting of at least about 3 months, more than about 1.8 years, more than about 2 years, about 6 months, about 9 months, about 12 months, about 18 months, more than about 19 months, about 24 months, about 3 years, about 5 years, and about 10 years.

129. An acid mine drainage treatment system according to claim 79 wherein said protective biofilm comprises a hydrophobic physical barrier.

130. An acid mine drainage treatment system according to claim 79 wherein said protective biofilm comprises an oxygen-reducing microbial barrier.

131. An acid mine drainage treatment system according to claim 76 and further comprising a metal precipitate in said acid mine drainage generation source.

132. An acid mine drainage treatment system according to claim 76 and further comprising a reduced iron concentration in said acid mine drainage generation source.

133. An acid mine drainage treatment system according to claim 80 wherein said surrounding environment comprises water.

* * * * *